United States Patent
Morohashi

(10) Patent No.: US 6,721,768 B2
(45) Date of Patent: Apr. 13, 2004

(54) RECORDING AND/OR REPRODUCING APPARATUS, PORTABLE RECORDING AND REPRODUCING APPARATUS, DATA TRANSFER SYSTEM, DATA TRANSFER METHOD, AND DATA RECORDING AND REPRODUCING METHOD

(75) Inventor: Akihiro Morohashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/421,215

(22) Filed: Apr. 23, 2003

(65) Prior Publication Data

US 2003/0195905 A1 Oct. 16, 2003

Related U.S. Application Data

(62) Division of application No. 09/774,750, filed on Jan. 30, 2001, now Pat. No. 6,675,179.

(30) Foreign Application Priority Data

Feb. 1, 2000 (JP) .................................... P2000-028929

(51) Int. Cl.⁷ .............................................. G06F 17/30
(52) U.S. Cl. ...................... 707/204; 707/202; 707/205; 715/500.1; 360/69; 369/93; 711/114
(58) Field of Search ............................. 360/69; 369/93, 369/96; 705/57; 707/104.1, 200, 202, 204, 205; 715/500.1, 501.1, 513, 514

(56) References Cited

U.S. PATENT DOCUMENTS

| | | | | |
|---|---|---|---|---|
| 5,448,473 A | * | 9/1995 | Takeuchi et al. | 715/500 |
| 5,519,684 A | * | 5/1996 | Iizuka et al. | 369/93 |
| 5,581,530 A | * | 12/1996 | Iizuka et al. | 369/93 |
| 5,870,756 A | * | 2/1999 | Nakata et al. | 707/200 |
| 5,875,459 A | * | 2/1999 | Taoda | 711/114 |
| 5,974,015 A | * | 10/1999 | Iizuka et al. | 386/96 |
| 6,278,984 B1 | * | 8/2001 | Itami et al. | 705/57 |

* cited by examiner

Primary Examiner—Shahid Alam
(74) Attorney, Agent, or Firm—Jay H. Maioli

(57) ABSTRACT

A portable recording and/or reproducing apparatus for receiving and recording and/or reproducing data and management data to and/or from a recording medium having a data area in which data are stored and a management data area in which the management data for managing these data are stored has a selecting circuit, a reproducing circuit, and a control circuit. The selecting circuit selects, in accordance with a user operation, group management data to be stored in the recording medium. The group management data are stored in the management data area and manage, as a data group, plural data stored in the data area. The reproducing circuit reads the selected group management data and the data group managed thereby. The control circuit controls the reproducing circuit to reproduce the plurality of data managed by the selected management data.

6 Claims, 13 Drawing Sheets

(INSIDE RECORDING/REPRODUCING APPARATUS)

(INSIDE PORTABLE APPARATUS)

TRANSFER DATA

RECORDING AND/OR REPRODUCING APPARATUS, PORTABLE RECORDING AND REPRODUCING APPARATUS, DATA TRANSFER SYSTEM, DATA TRANSFER METHOD, AND DATA RECORDING AND REPRODUCING METHOD

This is a division of prior application Ser. No. 09/774,750 filed Jan. 30, 2001, now U.S. Pat. No. 6,675,179.

BACKGROUND OF THE INVENTION

The present invention generally relates to a recording and/or reproducing apparatus, a portable recording and reproducing apparatus, a data transfer system, a data transfer method, and a data recording and reproducing method.

Various types of consumer audio visual devices are in widespread use, allowing users to personally enjoy music software and video software. For example, users own audio systems by which information is reproduced from disc record media such as a CD (Compact Disc) (trademark) and an MD (MiniDisc) (trademark) for example or record information thereto and portable reproducing devices by which information is reproduced from the above-mentioned disc recording media. These audio systems allow users to reproduce desired CDs and MDs or record desired music pieces for example to MDs, which are recordable, thereby creating users' original discs.

The related-art portable music reproducing devices, for example, portable CD players and portable MD players are intended to reproduce only one type of recording medium; for example, one CD or MD is loaded at time in these portable devices. Generally, one unit of a recording medium is provided as one music album in which plural music pieces (a music collection) are recorded. Therefore, a user may only reproduce one music collection at a time by a single portable player. In other words, if a user wants to reproduce music pieces recorded on plural music collections by a single portable player, the user must change the discs every time such a situation occurs. In the case of stationary audio systems, a disc changer system allows the reproduction of music pieces recorded on plural music collections by automatically changing the discs. However, the portable devices, which inevitably are required to be light in weight and small in size, cannot accommodate such a disc changer system.

With recording/reproducing devices using such recording media that users can record music data as MDs and memory cards based on flash memory, music collections provided by CDs for example can be recorded or users may selectively record desired music pieces. If the storage size of a recording medium is large enough, plural music collections may be recorded on a single recording medium. These recording/reproducing devices, when applied to portable players, allow users to listen to plural music collections only by loading one recording medium in a portable players. However, with these portable players, management is not made on a music collection basis on a recording medium. If the above-mentioned recording/reproducing devices record a collection of 10 pieces of music and another collection of 8 pieces for example on a single recording medium, management is made on the basis that 18 pieces are simply recorded on the recording medium, not on the basis that two collections of 10 pieces and 8 pieces are recorded. Therefore, if users want to reproduce only one of the collections, they cannot specify the desired one for reproduction.

SUMMARY OF THE INVENTION

It is therefore an object of the present invention to execute the reproduction of pieces of music (or main data) contained in plural music collections (namely, collections of main data) on a single recording medium while retaining the nature of collection as a music collection, without use of a recording-medium changer system, namely without changing recording media recorded with the main data.

In carrying out the invention and according to a first aspect thereof, there is provided a recording/reproducing apparatus for recording/reproducing data to/from a recording medium having a data area in which data are stored and a management data area in which management data for managing the data are stored, including selecting means for selecting group management data to be stored in the recording medium in accordance with a user operation, the group management data, stored in the management data area, managing, as a data group, a plurality of the data to be stored in the data area, reading means for reading the selected group management data and the data group managed by the group management data, and transfer means for transferring the group management data and the data group read by the reading means to an external apparatus.

In carrying out the invention and according to a second aspect thereof, there is provided a portable recording and reproducing apparatus for receiving data and management data for managing the received data, recording the received data and the received management data to a recording medium, and reproducing the recorded data from the recording medium, including recording means for recording a received data group in a data area of a recording medium and group management data for managing the received data group in a management data area of the recording medium, selecting means for selecting, in accordance with a user operation, the group management data to be recorded in the recording medium, reproducing means for reproducing a plurality of data managed by the selected group management data, and control means for controlling the reproducing means so as to reproduce, in units of the received data group, the plurality of data managed by the selected group management data.

According to a third aspect thereof, there is provided a data transfer system including a recording/reproducing apparatus for recording/reproducing data to/from a first recording medium having a data area in which data are stored and a management data area in which management data for managing the data are stored, the recording/reproducing apparatus including first selecting means for selecting, in accordance with a user operation, group management data to be stored in the first recording medium, the group management, stored in the management data area, managing a plurality of the data as a data group, reading means for reading the selected group management data and the data group managed by the selected group management data, and transfer means for transferring the read group management data and the data group managed by the group management data to an external device, and the data transfer system also including a portable recording and reproducing apparatus for receiving data and management data for managing the data received from the recording/reproducing apparatus and recording the received data and the received management data onto a second recording medium, including recording means for recording a data group received from the recording/reproducing apparatus into a data area of the second recording medium and the group management data into a management data area thereof, second selecting means for selecting, in accordance with a user operation, the group management data recorded on the second recording medium, reproducing means for reproducing a plurality of the data managed by the group management data, and control means for controlling the reproducing means so as to reproduce the plural data, in units of the data group, managed by the selected group management data.

According to a fourth aspect thereof, there is provided a recording/reproducing apparatus for recording/reproducing data to/from a recording medium having a data area in which music data are stored and a management data area in which management data for managing a plurality of the music data are stored, including selecting means for selecting, in accordance with a user operation, album management data to be stored in the recording medium, the album management data, stored in the management data area, managing a plurality of the music data as album data, reading means for reading the selected album management data and the album data managed thereby, and transfer means for transferring the read album management data and the read album data managed thereby to an external device.

According to a fifth aspect thereof, there is provided a data transfer method for transferring data from a recording medium having a data area in which data are stored and a management data area in which management data for managing the data are stored, including the steps of selecting group management data to be stored in the recording medium in accordance with a user operation, the group management data, stored in the management data area, managing, as a data group, a plurality of pieces of data to be stored in the data area, reading the selected group management data and the data group managed by the group management data, and transferring the read group management data and the read data group to an external apparatus.

According to a sixth aspect thereof, there is provided a data recording and reproducing method for receiving data and management data for managing the data to record the data and the management data to a recording medium and reproduce the data and the management data therefrom, including the steps of recording a received data group in a data area of a recording medium and group management data for managing the received data group in a management data area of the recording medium, selecting, in accordance with a user operation, the group management data to be recorded in the recording medium, reproducing a plurality of data managed by the selected group management data, and controlling the reproducing step so as to reproduce the plurality of data managed by the selected group management data in units of the received data group.

According to a seventh aspect thereof, there is provided a method for recording data and management data for managing the data transferred from a first recording medium having a data area in which the data are stored and a management data area in which the management data are stored and reproducing the data and the management data from the first recording medium, including the steps of selecting, in accordance with a user operation, group management data to be stored in the first recording medium, the group management, stored in the management data area, managing a plurality of the data as a data group, reading the selected group management data and the data group managed by the selected group management data, and transferring the read group management data and the data group managed by the group management data to an external device, recording the data group to a data area of a second recording medium and the group management data into a management data area thereof, selecting, in accordance with a user operation, the group management data recorded on the second recording medium, reproducing a plurality of the data managed by the group management data, and controlling the reproducing step so as to reproduce, in units of the data group, the plural data managed by the selected group management data.

According to an eighth aspect thereof, there is provided a data transfer method for transferring data from a recording medium having a data area in which the data are stored and a management data area in which management data for managing the data, including the steps of selecting, in accordance with a user operation, album management data to be stored in the recording medium, the album management data, stored in the management data area, managing a plurality of the music data as album data, reading the selected album management data and the album data managed thereby, and transferring the read album management data and the read album data managed thereby to an external device.

As described, the present invention provides the following advantages. The recording/reproducing apparatus according to the invention can send plural pieces of main data constituting a main data aggregate such as music collections for example to the portable apparatus for example along with collection managing data for managing these plural pieces of main data as the main data aggregate. The portable apparatus according to the invention manages records the received plural pieces of main data (for example, music data) on a recording medium and manages these data for reproduction by use of the received collection managing data, thereby reproducing the main data while retaining the concept of an aggregate such as a music collection. Consequently, the portable apparatus can execute various operations by making distinction between the plural main data collections on a single recording medium, thereby providing an advantage that user-specified reproducing operations such as the reproduction on a discrete music collection basis and the reproduction over plural music collections for example while retaining the concept of music collections without changing recording media. Further, if a recording medium to be loaded in the portable apparatus is of fixed type rather than changeable, the present invention allows users to listen to the reproduction of plural music collections. Still further, the capability of transferring the main data in a unit of a music collection between the recording/reproducing apparatus and the portable apparatus facilitates for users to easily handle the aggregates, which are music collections, thereby enhancing the user-friendliness of these apparatuses.

As described, the collection managing data can manage the number of times the main data collections are transferred and the number of times each piece of main data constituting a main data collection is transferred. In addition, the transfer control means of the recording/reproducing apparatus can control the execution of the transfer of each selected main data collection and each piece of main data in accordance with the number of times these data are transferred, thereby providing the appropriate transfer control for implementing copyright protection for example.

In addition, the collection managing data can manage the editing of the main data collections and the transfer control means of the recording/reproducing apparatus can control the execution of transferring the selected main data collection in accordance with the editing information managed by the collection managing data, thereby implementing copyright protection and transferring the main data collections of proper contents.

As described, the reproduction control means of the portable apparatus can control the reproduction of plural main data collections transferred and recorded on a recording medium in a specified reproduction sequence or in a random manner, thereby realizing the various manners of reproduction over plural main data collections (or plural music collections).

Moreover, the reproduction control means of the portable apparatus can control the execution of sequential reproduction, reproduction in specified order, and random reproduction of each piece of main data constituted specified one of the main data collections transferred and recorded on a recording medium, thereby realizing the reproduction of one main data collection (one music collection).

Consequently, the present invention allows various user-specified reproduction modes while retaining the music collections as conceived by users, thereby significantly enhancing user-friendliness.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

Figure 1:
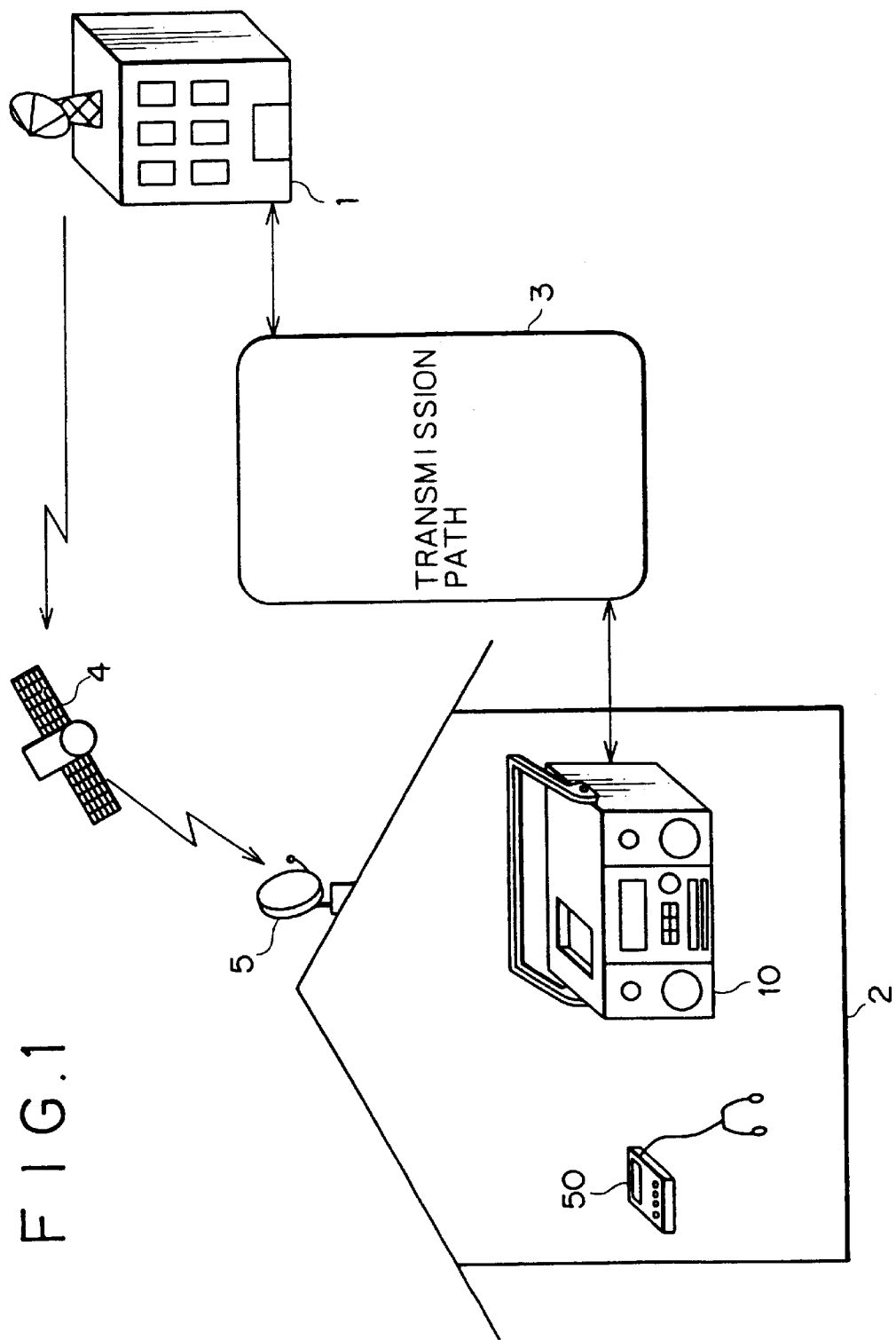
FIG. 1 is a schematic diagram illustrating an information distribution system including a recording/reproducing apparatus practiced as one preferred embodiment of the invention.

This invention will be described in further detail by way of example with reference to the accompanying drawings. The description will be made about a recording/reproducing apparatus 10, and a portable apparatus 50 and a data transfer system composed thereof, which are preferred embodiments of the present invention, in the order shown. It should be noted that the recording/reproducing apparatus 10 and the portable apparatus 50 in an example shown below also server as terminals of an information distribution system for distributing music information for instance. Therefore, the following description will also refer to such an information distribution system. It should also be noted that, in the above-mentioned preferred embodiments, main data denote music data by way of example and a main data collection is equivalent to a music collection (or so-called a music album). It should be noted again that collection managing data are equivalent to a list ID, music collection managing data, and music piece managing data.

(1) Overview of the information distribution system
(2) Exemplary external views of the recording/reproducing apparatus and the portable apparatus
(3) Internal configuration of the recording/reproducing apparatus
(4) Internal configuration of the portable apparatus
(5) Data structure as a music collection
(6) Transfer of a piece of music from the recording/reproducing apparatus to the portable apparatus
(7) Transfer of a music collection from the recording/reproducing apparatus to the portable apparatus
(8) Return of a piece of music from the portable apparatus to the recording/reproducing apparatus
(9) Return of a piece of music collection from the portable apparatus to the recording/reproducing apparatus
(10) Reproducing operations of the portable apparatus (1) Overview of the Information Distribution System:

Now, referring to FIG. 1, there is shown the information distribution system that contains the recording/reproducing apparatus 10 practiced as one preferred embodiment of the invention. Basically, the information distribution system is composed of the recording/reproducing apparatus 10 for use by general users in a home 2 and an information center 1 which provides services to the recording/reproducing apparatus 10.

Between the information center 1 and the recording/reproducing apparatus 10, various kinds of information can be transmitted over a transmission path 3 such as a communications line. The transmission path 3 may be a public line network such as ISDN line or a network dedicated to this system, the form of the line being not restricted. It is also practicable to constitute a satellite communications line by use of a communications satellite 4 and a parabola antenna 5 installed in the home 2, transferring information between the information center 1 and the recording/reproducing apparatus 10.

Further, the information distribution system may use a wireless communications network for use by cellular phones and transceivers or a communications network based on wireless communications standards for infrared, quasi-millimeter wave, or millimeter wave, for example, the Bluetooth (trademark) standard.

The recording/reproducing apparatus 10 for use by general users contains a large-capacity data file storage section (for example, a hard disk drive 15 shown in FIG. 3) and has a drive capability for driving a package medium as CD and MD, a data input capability of capturing data from other devices, and a data input capability of capturing data via the transmission path 3. The recording/reproducing apparatus 10 can store, in its data file storage section, various data such as audio data, video data, image data, and programs reproduced from user-purchased recording media such as CD, CD-ROM, and MD and various data inputted from other devices and the transmission path 3.

The above-mentioned recording/reproducing apparatus can reproduce the stored files (for example, one piece of music is stored as one file) as instructed by the user. Consequently, if a user having many CDs stores every music piece in every CD as one file into the recording/reproducing apparatus 10, the user can execute the reproduction of desired music pieces without loading CDs by use of this recording/reproducing apparatus.

The information center 1 can provide various kinds of information at cost or not to the recording/reproducing apparatus 10.

The information center 1 can provide such information associated with the files of music pieces for example stored in the recording/reproducing apparatus 10 as title, artist name, text data of lyrics, image data including music image and artists, Internet home page address URL (Uniform Resource Locator) of artist, copyright, and names of parties concerned (writer, composer, producer, and so on) for instance. The recording/reproducing apparatus 10 stores these kinds of information provided (or downloaded) from the information center 1 as related to each music piece. Then, when the recording/reproducing apparatus 10 reproduces a particular piece of music, these kinds of information are used in executing various operations such as displaying the images corresponding to the reproduced music piece for example.

Sometimes, the information center 1 sends audio data themselves, namely pieces of music, to the recording/reproducing apparatus 10, which can store these audio data as files. That is, the present invention can also build an electronic audio data sale system which is different from the sale of package media such as CDs.

Figure 4:
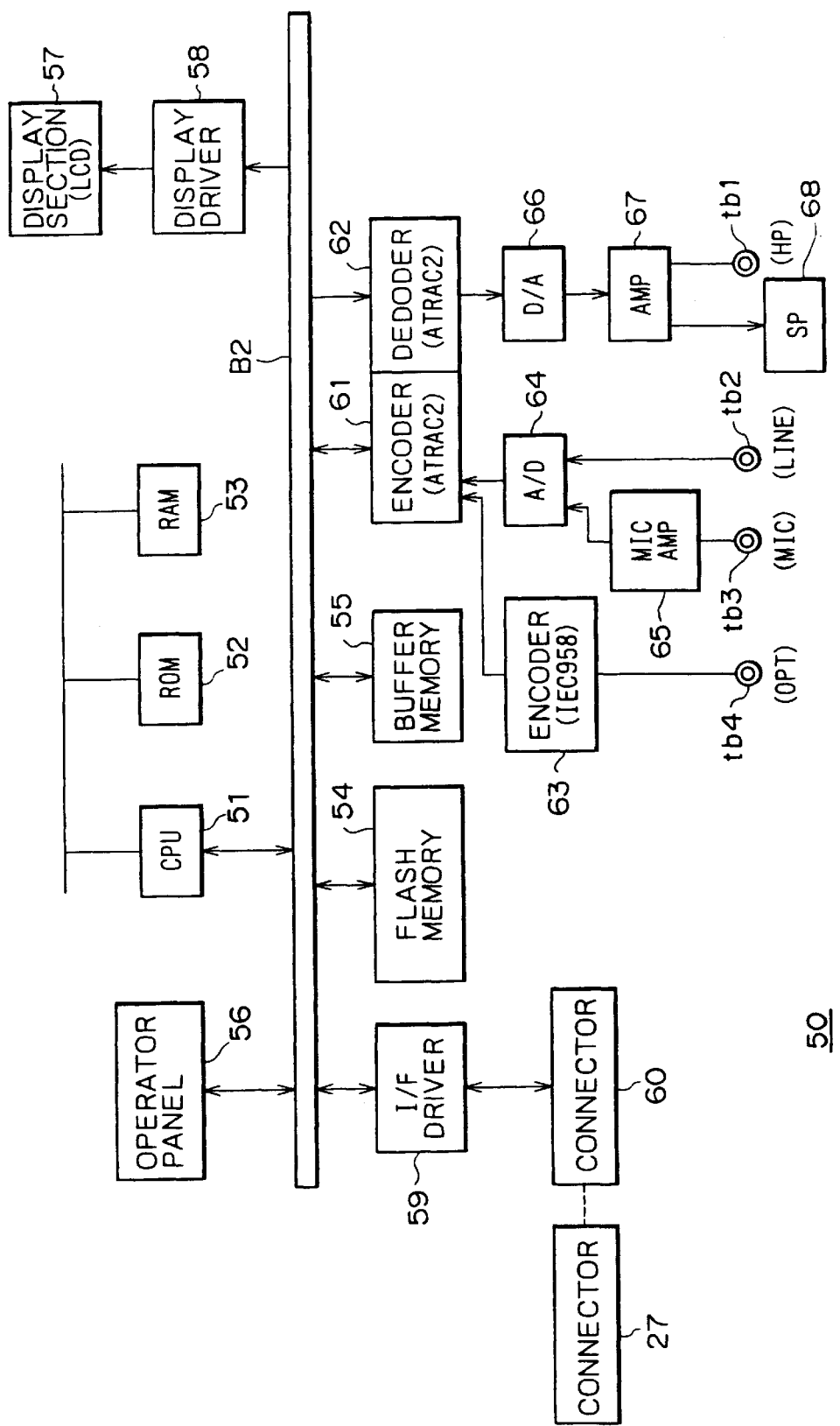
FIG. 4 is a block diagram illustrating the above-mentioned portable apparatus.

As described, the present embodiment also has the portable recording and reproducing apparatus 50 (hereafter referred to as the portable apparatus 50) which can be connected to the recording/reproducing apparatus 10. The portable apparatus 50 incorporates a data file storage section (for example, a flash memory 54 as shown in FIG. 4) for storing files of audio data for example, the portable apparatus 50 to be detailed later.

When the portable apparatus 50 is connected to the recording/reproducing apparatus 10, files (for example, music pieces) stored therein can be copied or moved to the data file storage section of the portable apparatus 50. Obviously, files stored in the data file storage section of the portable apparatus 50 can be copied or moved to the data file storage section of the recording/reproducing apparatus 10.

By moving or copying a desired one of the files from the recording/reproducing apparatus 10 to the portable apparatus 50, the user can use this file on the portable apparatus 50. For example, the user can move or copy desired music pieces to the portable apparatus 50 and carry about the same to listen to the copied or moved music pieces.

Figure 2:
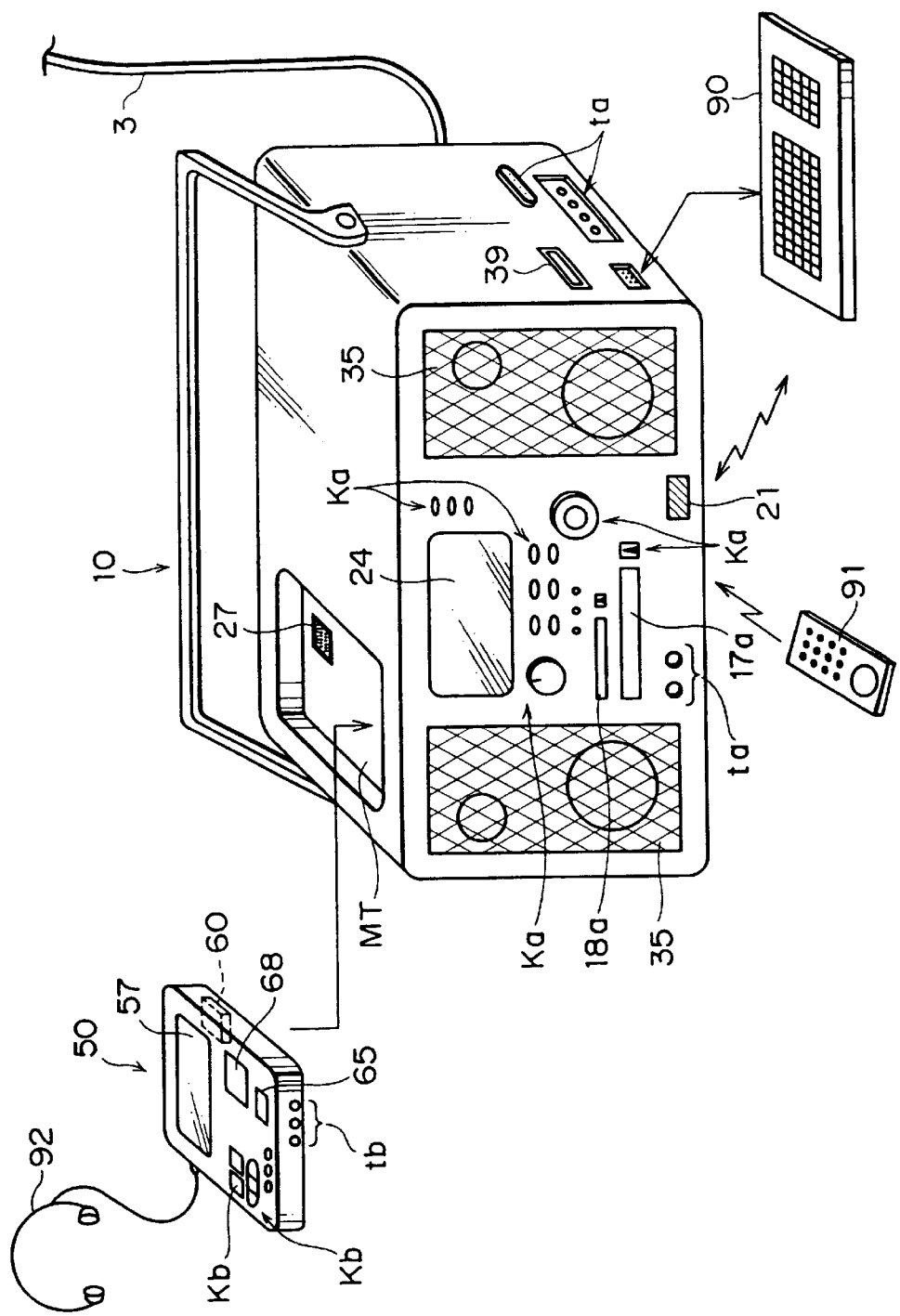
FIG. 2 is a perspective view illustrating the above-mentioned recording/reproducing apparatus and a portable apparatus practiced as another preferred embodiment of the invention.

(2) Exemplary External Views of the Recording/Reproducing Apparatus and the Portable Apparatus:

Referring to FIG. 2, there are shown the external views of the recording/reproducing apparatus 10 and the portable apparatus 50 by way of example. It should be noted that these external views are illustrative only and therefore there are variations to the external views, the user interface configuration (the configuration for user operations and corresponding displays), and the connection form between the recording/reproducing apparatus 10 and the portable apparatus 50.

As shown in FIG. 2, the recording/reproducing apparatus 10 is so-called radio cassette recorder type device so as to make the apparatus suitable for use in user's home for example. Obviously, the recording/reproducing apparatus 10 may be of component type.

The recording/reproducing apparatus 10 has various controls Ka for the user to execute various operations, the controls Ka including operator keys and knobs, a rotary push key called a jog dial arranged on its front panel.

The recording/reproducing apparatus 10 also has an output section including a speaker 35 for outputting reproduced sound and a display section 24 for displaying various kinds of information. The display section 24 is constituted by an LCD (Liquid Crystal Display) panel for example.

The recording/reproducing apparatus 10 also has a CD loader 17a for accommodating CD-type discs (audio CD, CD-ROM, and CD text) owned by the user to be reproduced by the recording/reproducing apparatus 10. The recording/reproducing apparatus 10 can copy data reproduced from CD-type discs loaded in the CD loader 17a onto its hard disk.

Further, the recording/reproducing apparatus 10 has an MD loader 18a for accommodating MD-type discs (audio MD and MD data) owned by user and to be reproduced by the recording/reproducing apparatus 10. The recording/reproducing apparatus 10 can copy data reproduced from MD-type discs loaded in the MD loader 18a onto its hard disk.

In addition, the recording/reproducing apparatus 10 has various terminals ta for connecting this apparatus to various external apparatuses. These terminals ta include microphone and headphone terminals, line connection terminals for audio visual equipment and a personal computer, an optical digital connection terminal, and interface connectors.

In addition to the above-mentioned controls Ka, the recording/reproducing apparatus 10 has a keyboard 90 and a remote commander 91 as user operation input means. The keyboard 90 is connected to the recording/reproducing apparatus 10 through a keyboard connector, one of the terminals ta. If an infrared transmitter is installed on the keyboard 90, the output of the keyboard 90 is wirelessly received by a photo receptor 21 of the recording/reproducing apparatus 10. The remote commander 91 outputs operator control information in an infrared manner for example. The operator control information carried by an infrared signal is inputted in the recording/reproducing apparatus 10 through the photo receptor 21. It will be apparent to those skilled in the art that the output of the remote command 91 may alternatively transmitted by radio wave.

The recording/reproducing apparatus 10 also has a PCMCIA (Personal Computer Memory Card International Association) slot 39 for accommodating a PCMCIA card for data transfer.

The portable apparatus 50 is a device small in size and light in weight for user convenience in carrying it about. The portable apparatus 50 has various controls Kb including control keys which are operated by the user to execute various operations. Although not shown, a jog dial may also be arranged on this apparatus. The portable apparatus 50 also has a speaker 68 for outputting reproduced sound and a display section 57 for displaying various kinds of information. The display section 57 is constituted by an LCD panel for example.

The portable apparatus 50 has various terminals tb for connecting this apparatus to external apparatuses. These terminals ta include microphone and headphone terminals, line connection terminals for audio visual equipment and a personal computer, an optical digital connection terminal, and interface connectors. For example, when the user listens to music on the portable apparatus 50, the sound is outputted from not only the speaker 68 but also a headphone 92 connected to this apparatus through the headphone terminal, one of the terminals tb.

Connecting the recording/reproducing apparatus 10 with the portable apparatus 50 allows the transfer of various data (file data such as audio data and control data for processing the transfer of these audio data for example) between them. In the present embodiment, the recording/reproducing apparatus 10 has a mount MT equipped with a connector 27. Setting the portable apparatus 50 into the mount MT connects the portable apparatus 50 to the recording/reproducing apparatus 10. To be more specific, when the portable apparatus 50 is set in the mount MT, a connector 60 arranged on the bottom of the portable apparatus 50 mates with the connector 27 of the mount MT, by which data are transferred between both apparatuses. It will be apparent to those skilled in the art that the connection between these apparatuses may alternatively be made on the basis of line connection by use of a communications cable or wireless connection by use of infrared transmission.

Figure 3:
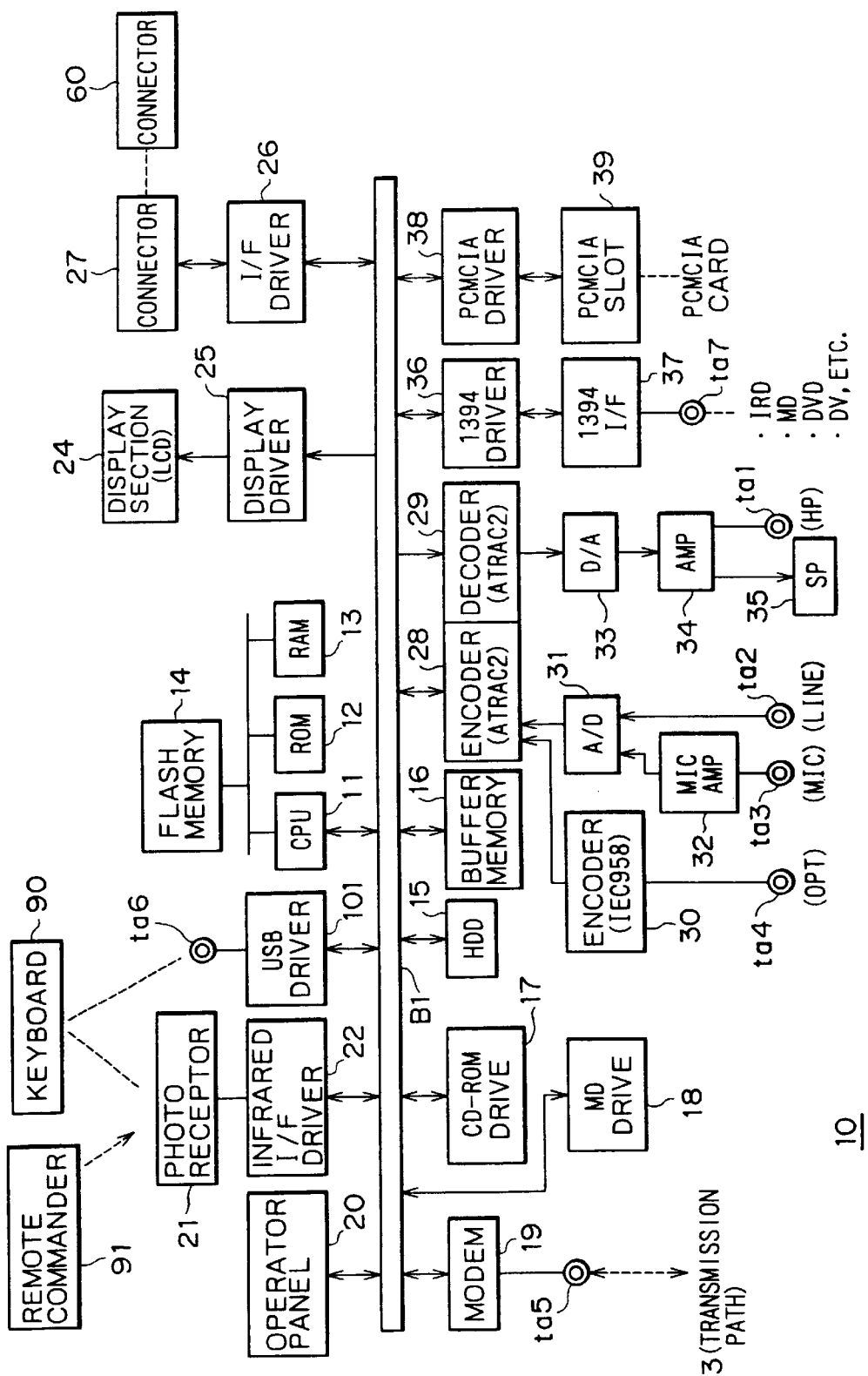
FIG. 3 is a block diagram illustrating the above-mentioned recording/reproducing apparatus.

(3) Internal Configuration of the Recording/Reproducing Apparatus:

The following describes an internal configuration of the recording/reproducing apparatus 10 by way of example with reference to FIG. 3. As described, a push or rotary controls are arranged as an operator panel 20 on the recording/reproducing apparatus 10. These controls are equivalent to the various controls Ka shown in FIG. 2. Namely, these controls are those arranged on the case of this apparatus. Although not described with reference to FIG. 2, the display section 24 may have a touch-sensitive display panel by which the user can operates displayed controls. These displayed controls are included in the operator panel 20. When the user inputs instructions for executing desired operations, the recording/reproducing apparatus 10 operates as instructed.

In order to facilitates the inputting of title, artist names, and so on corresponding to audio information to be recorded for example, the recording/reproducing apparatus 10 has the keyboard 90 and the remote commander 91 as described above. Connecting the keyboard 90 to a USB (Universal Serial Bus) terminal ta6 allows the inputting of user instructions from the keyboard 90. Namely, an input signal (a user instruction) generated by the keyboard 90 is supplied to a USB driver 101 via the USB terminal ta6 to be captured in the recording/reproducing apparatus 10. It should be noted that the terminals ta1 through ta7 shown in FIG. 3 respectively correspond to the terminals ta shown in FIG. 2.

An operator signal carried by infrared radiation from the remote commander 91 (or an operator signal carried by infrared radiation from the keyboard 90 if it so constructed) is photoelectrically converted in the photo receptor 21 for supply to an infrared interface driver 22, thus being captured in the recording/reproducing apparatus 10.

The recording/reproducing apparatus 10 may execute data transfer via the infrared interface driver 22 or the USB driver 101.

The recording/reproducing apparatus 10 incorporates a ROM 12, a RAM 13, and a flash memory 14 like the configuration of a personal computer. A CPU 11 controls the recording/reproducing apparatus 10 in its entirety. The transfer of file data and control data between the components of the recording/reproducing apparatus 10 is executed over a bus B1.

The ROM 12 stores programs and data for controlling the operation of the recording/reproducing apparatus 10 in accordance with an input signal generated when the operator panel 20 is operated (or an input signal from the keyboard 90 or the remote commander 91). In the RAM 13 and the flash memory 14, a data area and a task area for executing programs are allocated temporarily. The ROM 12 also stores a program loader, by which programs themselves can be loaded into the flash memory 14.

A CD-type optical disc (audio CD, CD-ROM, or CD text for example) is set into a CD-ROM drive 17 from the CD loader 17a. The CD-ROM drive 17 reads information from a loaded optical disc by its optical pickup at a normal or a high speed such as 16× and 32×.

An MD-type optical disc or magneto-optical disc (audio MD or MD data) is set into an MD drive 18 from the MD loader 18a. The MD drive 18 reads information from a loaded MD disc by its optical pickup or records information to a loaded MD disc.

In the present embodiment, the recording/reproducing apparatus 10 has both the CD-ROM drive 17 and the MD drive 18. It will be apparent to those skilled in the art that only one of these drives may be arranged or other drives may be arranged that are compatible with such recording media other than CD-ROM and MD as a magneto-optical disc called MO disc, a optical disc based on another scheme, a magnetic disc, and a memory card. In addition, the memory card may not be format-dependent; namely, the memory card may be any of semiconductor flash memories such as Memory Stick (trademark), SD memory card (trademark), Compact Flash (trademark), Smart Media (trademark), Multimedia Card (trademark), Micro Drive (trademark), ID Format (trademark), and ThumDrive (trademark) or any of memory cards incorporating a microcomputer having authentication functionality.

For the large-capacity storage means of the recording/reproducing apparatus 10, a hard disk drive (HDD) 15, which records and read information to and from the hard discs in this drive is arranged. For example, music data are transferred from the CD-ROM drive 17 or the MD drive 18 to be stored on the HDD 15 on a file basis (one piece of music constituting one file for example).

The recording/reproducing apparatus 10 also has an encoder 28 for compressingly encoding audio data on the basis of ATRAC2 (Adaptive Transform Acoustic Coding 2) (trademark) and a decoder 29 for decoding the encoded audio data encoded by ATRAC2. The encoder 28 and the decoder 29 encodes and decodes the supplied audio data under the control of the CPU 11. The recording/reproducing apparatus 10 has a buffer memory 16 for temporarily holding the audio data to be processed. The buffer memory 16 is accessed for writing and reading data under the control of the CPU 11.

In storing the audio data read by the CD-ROM drive 17 from a loaded disc into the HDD 15 for example, the audio data are pre-processed before being stored in the HDD 15; namely, the audio data are temporarily stored in the buffer memory 16 and then encoded by the encoder 28 by ATRAC2 to be temporarily held in the buffer memory 16 again, finally being stored on the HDD 15.

In the present embodiment, the audio data encoded by the encoder 28 in ATRAC2 are stored on the HDD 15. It will be apparent to those skilled in the art that data read from the CD-ROM drive 17 for example may be directly stored on the HDD 15, namely without being compressingly encoded.

The encoder 28 not only encodes data read from a recording medium loaded in the CD-ROM drive 17 but also receives audio signals coming from the microphone terminal ta3 through an amplifier 32 or audio signals coming from the line input terminal ta2 through an A/D converter 31. The recording/reproducing apparatus 10 can also encode these music data by means of the encoder 28.

In addition, the recording/reproducing apparatus 10 is configured so that data inputted from external apparatus (for example, a CD player) connected to the optical digital terminal ta4 are supplied to the encoder 28 via an IEC958 (International Electrotechnical Commission 958) encoder 30. The recording/reproducing apparatus 10 can also encode these data supplied in an optical digital manner by means of the encoder 28.

As described, the recording/reproducing apparatus 10 is configured so that the data inputted from external apparatus are-encoded by the encoder 28 and the encoded data are stored on the HDD 15 on a file basis.

In the present embodiment, ATRAC2 is used for the encoding algorithm of the encoder 28. Obviously, the encoding algorithm is not restricted to ATRAC2. Any other encoding algorithms are available; for example, ATRAC or ATRAC3, MPEG3 (Moving Picture Coding Experts Group Audio Layer 3), MPEG-2AAC (MPEG 2 Advanced Audio Coding), QDesign Music Codec (trademark), PASC (Precision Adaptive Sub-band Coding), TwinVQ (Transform Domain Weighted Interleave Vector Quantization) (trademark), Real Audio (trademark), Liquid Audio (trademark), MS Audio (Microsoft Audio (WMA Windows Media Audio)) (trademark), and Ogg Vorbis (trademark).

The recording/reproducing apparatus 10 has a modem 19 which interfaces this apparatus with the Internet, a TEL network, a cable TV, or a wireless network for example, which is connected to the communications terminal ta5 as the transmission path 3.

Such a communications interface compatible with a communications infrastructure as the modem 19 for example allows the recording/reproducing apparatus 10 to download and upload various kinds of information with servers on external networks with which this apparatus can communicate over the transmission path 3. For example, the recording/reproducing apparatus 10 can receive music data which are pieces of music or music collections, such additional information to music data as title, artist name, composer name, writer name, lyrics, and jacket cover image, or, conversely, provide information to the information center 1.

The music data for example stored in the HDD 15 are decoded by the decoder 29, converted by a D/A converter 33 from digital to analog, and outputted from the speaker 35 via an amplifier 34. Alternatively, the music data for example are outputted from a headphone connected to the headphone terminal ta1.

In the present embodiment, the data are decoded by the decoder 29 based on ATRAC2. It will be apparent that the decoding algorithm is not restricted to ATRAC2; any other decoding algorithms are available if compatible with the encoding algorithm used in the encoder 28. The encoding and decoding may be executed by the CPU 11 in software approach.

The recording/reproducing apparatus 10 has the display section 24 as shown in FIG. 2 to provide interface for the user to manage and control the files of music data for example stored on the HDD 15. The display section 24 is drivingly controlled by a display driver 25. On the display section 24, predetermined characters, symbols, icons, and so on are displayed under the control of the CPU 11.

The display section 24 also shows folders or jacket images corresponding to various files. These displayed entities can be manipulated on-screen by means of pointing devices such as a mouse, a touch pen, and the finger of user, which are equivalent to the controls on the operator panel 20. For example, the user can specify a particular file on-screen to be reproduced. It should be noted that a file herein denotes a data file containing music data and control information.

The user can perform, through the display section 24, such operations as deletion of selected files and their copying or moving to external apparatus like the portable apparatus 50. In addition, the display section 25 shows HTML (Hyper Text Markup Language) documents retrieved from WWW (World Wide Web) sites on the Internet on the basis of the TOC (Table Of Contents) information provided by a recording medium loaded in the CD-ROM drive 17. Moreover, the display section 25 provides the functionality of an ordinary Internet browser.

The recording/reproducing apparatus 10 is also configured to capture audio information from the various devices and systems connected to the terminal ta7, for example an IRD (Integrated Receiver Decoder) for satellite broadcasting, an MD player, a DVD (Digital Video Disk/Digital Versatile Disk) player, and a DV (Digital Video) player, via an IEEE 1394 interface 37 and an IEEE 1394 driver 36.

The recording/reproducing apparatus 10 also has the PCMCIA card slot 39 which is drivingly controlled by a PCMCIA driver 38, thereby providing peripheral device extensions such as external storage device, other media drives than mentioned above, modem, terminal adapter, and capture board.

Further, as shown in FIG. 2, the recording/reproducing apparatus 10 has the connector 27 that provides the connection between this apparatus with the portable apparatus 50. When the connector 27 is connected with the connector 60 of the portable apparatus 50, the CPU 11 can communicate with the portable apparatus 50 through the interface driver 26. Consequently, the music data for example stored in the HDD 15 can be transferred to the portable apparatus 50.

(4) Internal Configuration of the Portable Apparatus:

The following describes an exemplary internal configuration of the portable apparatus 50 with reference to FIG. 4. When the connector 27 is connected to the connector 60, the recording/reproducing apparatus 10 and the portable apparatus 50 are electrically interconnected. In the connected state, the interface driver 26 of the recording/reproducing apparatus 10 is connected to an interface driver 59 of the portable apparatus 50, thereby making the data communication ready between these apparatuses. It will be apparent to those skilled in the art that these apparatus may alternatively interconnected by an IEEE 1394 cable.

The portable apparatus 50 has an operator panel 56 constituted by push and rotary switches and a jog dial for example. Namely, the controls Kb shown in FIG. 2 are equivalent to the operator panel 56. When any of the controls Kb as the operator panel 56 is operated by the user, a corresponding operation signal is sent over a control bus B2 to the portable apparatus 50, which then operates accordingly.

Like the recording/reproducing apparatus 10, the portable apparatus 50 has a RAM 53 and a ROM 52, which form a normal computer configuration. The overall operation of the portable apparatus 50 is controlled by a CPU 51. The transfer of file data and control data between the component blocks is executed via the control bus B2.

The ROM 52 stores programs to be executed by the portable apparatus 50 in accordance with an operation signal inputted from the operator panel 56. In the RAM 53, a data area and a task area are temporarily allocated for the execution of programs. Like the recording/reproducing apparatus 10, the portable apparatus 50 may have a flash memory. Further, the control bus B2 is not limited to the configuration mentioned above.

For an internal storage means for storing music data for example, a solid-state memory element such as a flash memory 54 for example is arranged. The flash memory 54 stores the music data transferred from the recording/reproducing apparatus 10, for example. It will be apparent to those skilled in the art that a HDD but not exclusively may be used for the flash memory.

The flash memory 54 may be of a detachable type implemented by a memory card for example or may be fixedly arranged inside the portable apparatus 50. In addition, the memory card may not be format-dependent; namely, the memory card may be any of semiconductor flash memories such as Memory Stick (trademark), SD memory card (trademark), Compact Flash (trademark), Smart Media (trademark), Multimedia Card (trademark), Micro Drive (trademark), ID Format (trademark), and ThumDrive (trademark) or any of memory cards incorporating a microcomputer having authentication functionality.

Like the recording/reproducing apparatus 10, the portable apparatus 50 also has an encoder 61 for compressingly encoding audio data on the basis of ATRAC2 and a decoder 62 for decoding the encoded audio data encoded by ATRAC2. The encoder 61 and the decoder 62 encodes and decodes the supplied audio data under the control of the CPU 51. The portable apparatus 50 has a buffer memory 55 for temporarily holding the audio data to be processed. The buffer memory 55 is accessed under the control of the CPU 51.

In storing the music data not encoded in ATRAC2 supplied from the recording/reproducing apparatus 10 via the interface driver 59 into the flash memory 54 for example, the music data are pre-processed before being stored in the flash memory 54; namely, the music data are temporarily stored in the buffer memory 55 and then ATRAC2-encoded by the encoder 61 to be temporarily held in the buffer memory 55 again, finally being stored on the flash memory 54.

In the present embodiment, the HDD 15 of the recording/reproducing apparatus 10 stores music data and so on encoded in ATRAC2. Therefore, when the music data are supplied from the HDD 15 via the interface driver 59 to be stored in the flash memory 54, namely data files of music for example are copied or moved, the processing by the encoder 61 is not required. However, if music data (data before compression) are directly inputted from a recording medium loaded in the CD-ROM drive 17 for example of the recording/reproducing apparatus 10 into the portable apparatus 50 via the interface driver 59, the encoding by the encoder 61 is executed as described above.

In the present embodiment, the music data ATRAC2-encoded by the encoder 61 are stored in the flash memory 54. It will be apparent to the those skilled in the art that data before compression may be directly stored in the flash memory 54.

In addition to the interface driver 59, a microphone terminal tb3, a line input terminal tb2, and an optical digital terminal tb4 are arranged for supplying audio data to the encoder 61. It should be noted that the terminals tb1 through tb4 shown in FIG. 4 are respectively equivalent to the terminals tb shown in FIG. 2.

The encoder 61 receives audio signals coming from the microphone terminal tb3 through an amplifier 65 or audio signals coming from the line terminal tb2 through an A/D converter 64. These audio digital data are also encoded by means of the encoder 61.

In addition, the portable apparatus 50 is configured so that data inputted from external apparatus (for example, a CD player) connected to the optical digital terminal tb4 are supplied to the encoder 61 via an IEC958 encoder 63. The portable apparatus 50 can also encode these data supplied in an optical digital manner by means of the encoder 61.

As described, the portable apparatus 50 is configured so that the data inputted from external apparatus are encoded by the encoder 61 and the encoded data are stored in the flash memory 54 on a file basis.

In the present embodiment, ATRAC2 is used for the encoding algorithm of the encoder 61. Obviously, the encoding algorithm is not restricted to ATRAC2. Any other encoding algorithms are available; for example, ATRAC (trademark) or ATRAC3 (trademark), MPEG3 (Moving Picture Coding Experts Group Audio Layer 3) (trademark), PASC (Precision Adaptive Sub-band Coding) (trademark), TwinVQ (Transform Domain Weighted Interleave Vector Quantization) (trademark), Real Audio (trademark), Liquid Audio (trademark), MS Audio (Microsoft Audio (WMA Windows Media Audio)) (trademark), and Ogg Vorbis (trademark).

The music data for example stored in flash memory 54 are decoded by the decoder 62, converted by a D/A converter 66 from digital to analog, and sounded from the speaker 68 via an amplifier 67. Alternatively, the music data for example are sounded from a headphone connected to the headphone terminal tb1.

In the present embodiment, the data are decoded by the decoder 62 based on ATRAC2. It will be apparent that the decoding algorithm is not restricted to ATRAC2; any other decoding algorithms are available if compatible with the encoding algorithm used in the encoder 61. The encoding and decoding may be executed by the CPU 51 in software approach.

The portable apparatus 50 has the display section 57 as shown in FIG. 2 to provide interface for the user to manage and control the files of music data for example stored on the flash memory 54. The display section 57 is drivingly controlled by a display driver 58. On the display section 57, predetermined characters, symbols, icons, and so on are displayed under the control of the CPU 51.

The display section 57 also shows folders or jacket images corresponding to various files. These displayed entities can be manipulated on-screen by means of pointing devices such as a mouse, a touch pen, and the finger of user, which are equivalent to the controls on the operator panel 20. For example, the user can specify a particular file on-screen to be read from the flash memory 54 and sounded from the speaker 35. The user can perform, through the display section 57, such operations as deletion of selected files and their copying or moving to apparatus equipment (for example, the recording/reproducing apparatus 10).

As described with reference to FIG. 2, the portable apparatus 50 may be mounted on the mount MT of the recording/reproducing apparatus 10 for data transmission and reception therebetween. It will be apparent to those skilled in the art that the communication between the portable apparatus 50 and the recording/reproducing apparatus 10 may be executed by a non-contact type interface; for example, wireless communications standards such as based on quasi-millimeter wave, millimeter wave, or infrared rays including IrDA and Bluetooth standards.

Although not shown, the recording/reproducing apparatus 10 may have a charge current supply section for supplying a charge current to the mounted portable apparatus 50 to charge a chargeable battery of the portable apparatus 50.

(5) Data Structure as a Music Collection:

The following describes a structure of managing the music data, on a music collection basis, which are stored on the HDD 15 of the recording/reproducing apparatus 10 and the flash memory 54 of the portable apparatus 50 according to the invention.

The HDD 15 of the recording/reproducing apparatus 10 stores various kinds of music data. For example, these data include the music data reproduced from recording media such as CD and MD and the music data distributed over the transmission path 3. Each piece of music data, namely the data of one title of music, may be managed alone or plural pieces of music data may be managed in the form of a music collection (namely a so-called music album). The data structure as a music collection is as shown in FIG. 5.

Figure 5:
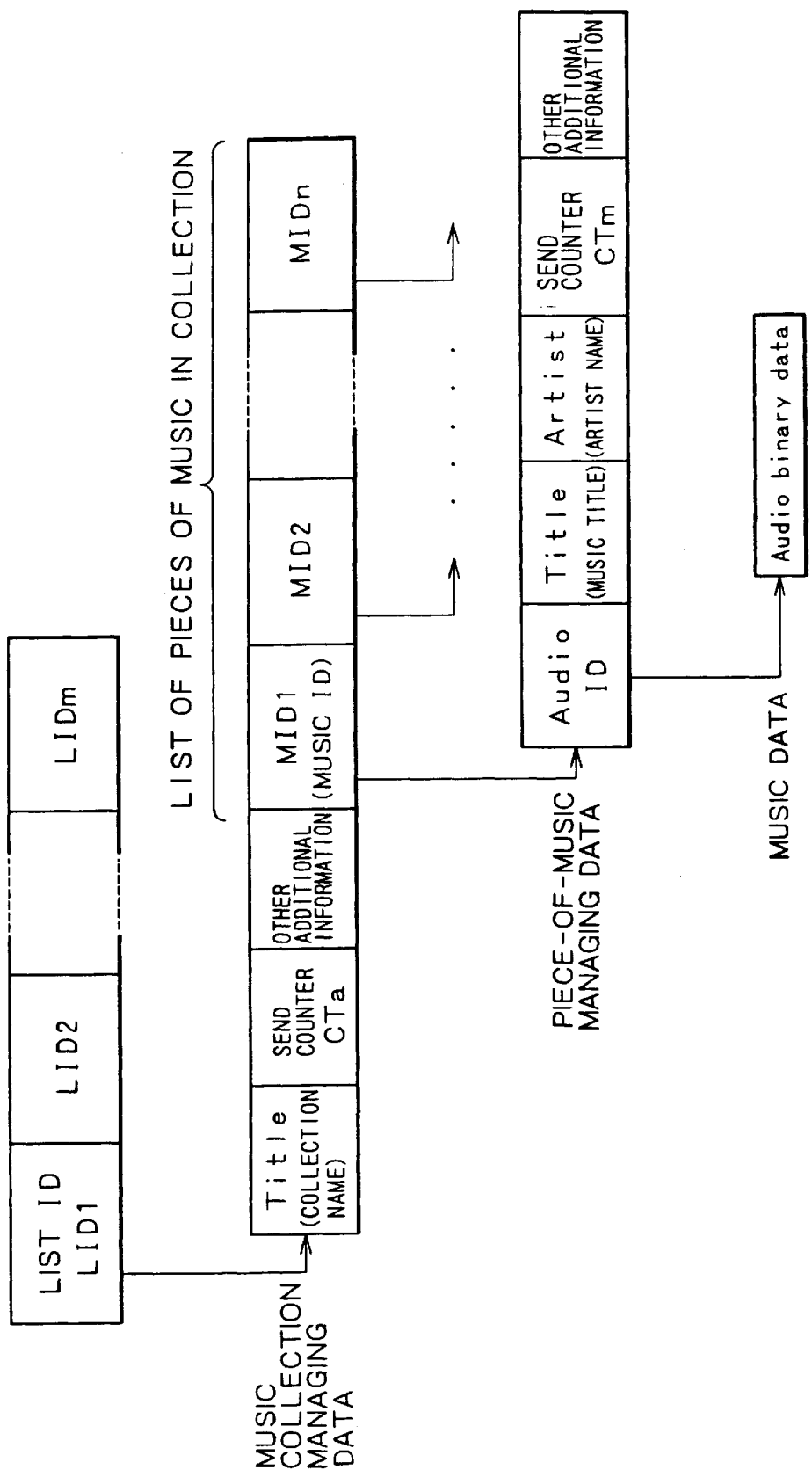
FIG. 5 illustrates a managing structure of music data practiced one still another preferred embodiment of the invention.
Figure 6A:
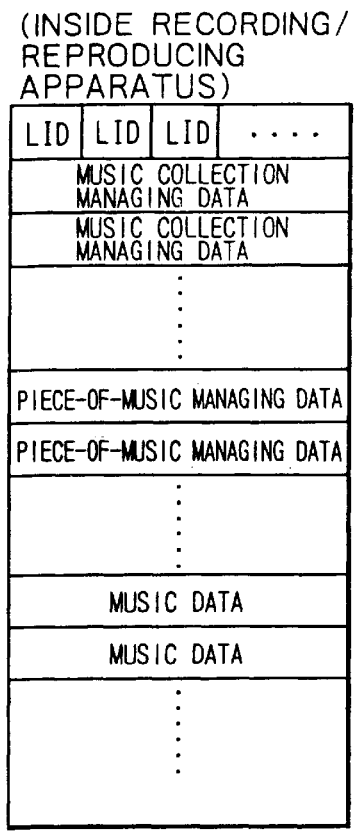
FIG. 6A illustrates a data structure of music data and managing data in the above-mentioned recording/reproducing apparatus.

FIG. 5 shows a data structure based-on list ID (LID1, LID2 and so on), music collection managing data, piece-of-music managing data (namely the data for managing one piece of music), and music data. For example, HDD 15 stores plural pieces of each of these data as shown in FIG. 6A.

The list ID is identification information indicative of one music collection. For example, if there are m list IDs, the HDD 15 stores m music collections. As shown in FIG. 5, one list ID indicates one piece of music collection managing data.

The music collection managing data include a title of the music collection, a send counter CTa, additional information, and music IDs (MID1, MID2, . . . MIDn) as a list of individual music pieces contained in this music collection. The number of music IDs is equivalent to the number of pieces of music contained in this music collection, namely the number of pieces of music data.

The send counter CTa provides information for counting the number of times a music collection managed by these music collection managing data has been sent to another recording medium or another electronic device. For example, the send counter CTa indicates the number of times a music collection has been sent to the portable apparatus 50.

The additional information records an artist name, a producer name, copyright information, and other information. Further, the additional information may record a session number for identifying the recording/reproducing apparatus 10 for example and information indicative of whether these music collection managing data have been edited or not.

One music ID indicates one piece of piece-of-music managing data. The piece-of-music managing data correspond to one piece of music data. Namely, the piece-of-music managing data has information associated with one piece of music data (one title of music). The piece-of-music managing data starts with an audio ID which indicates the corresponding music data. Further, the piece-of-music managing data contains a music title, an artist name, a send counter CTm, and additional information. The send counter CTm provides information for counting the number of times the music data corresponding to these piece-of-music managing data have been sent to another recording medium. The additional information contains music-associated information such as copyright information associated parties (lyrics writer, composer, producer, etc.), and lyrics.

The data structure shown in FIG. 5 allows each piece of music data to be managed as an element for constituting a music collection. It should be noted that the data structure shown in FIG. 5 also allows a state in which one piece of music data is contained in two or more music collections at a time; namely a state in which different pieces of piece-of-music managing data included in different list IDs indicate the same music data.

The above-mentioned music collection managing form is created in the case in which one or more pieces of music data are recorded as a music collection on the HDD 15. For example, if all data are copied from such a recording medium as one music album as a CD or an MD onto the HDD 15, the CPU 11 references the managing information, for example, TOC data of that recording medium and forms a managing structure as shown in FIG. 5, storing it in the HDD 15.

This holds true with the case in which a music collection is downloaded into the HDD 15 via the transmission path 3. At or after the downloading, the managing information about the downloaded music collection is supplied from its external server, so that the CPU 11 can store the managing structure shown in FIG. 5 into the HDD 15.

Further, one or more pieces of music data stored by the user into the HDD 15 by operating the operator panel 20 for example are selected and these selected music data may be managed as one music collection. In this case, the CPU 11 forms the managing structure shown in FIG. 5 onto the HDD 15 in accordance with the operation performed by the user for selecting the music pieces included in the music collection.

Figure 6C:
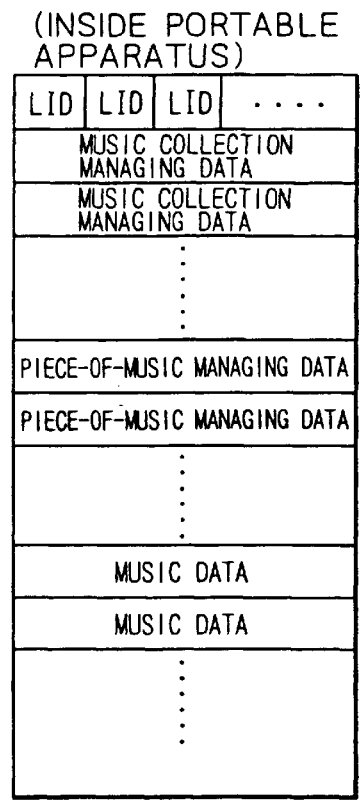
FIG. 6C illustrates a data structure of the transferred data as recorded in the above-mentioned portable apparatus.
Figure 6B:
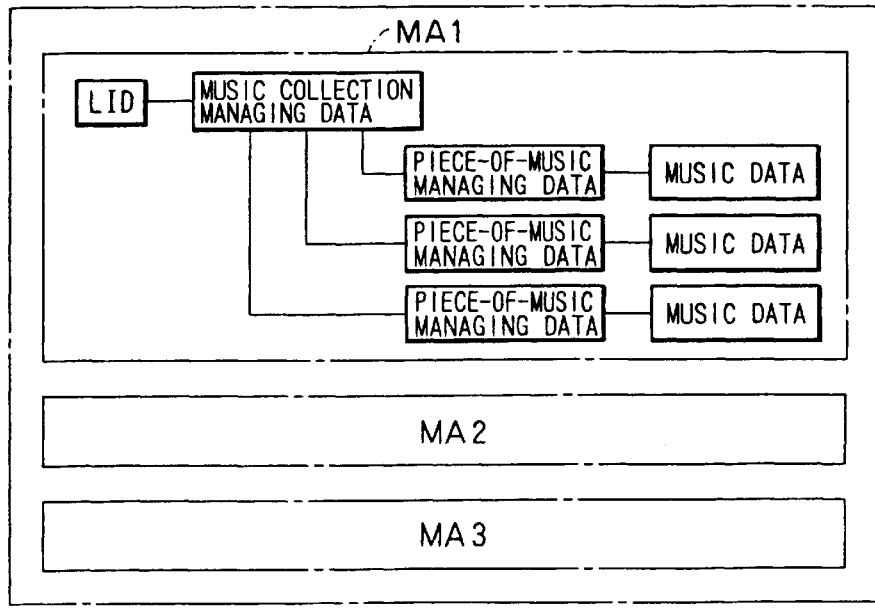
FIG. 6B illustrates a data structure of data transferred from the above-mentioned recording/reproducing apparatus to the above-mentioned portable apparatus.

In the present embodiment, files are formed in structure on the HDD 15 for example on a music collection basis as described above, so that the recording/reproducing apparatus 10 can transfer music data on a music collection basis to the portable apparatus 50, the transferred music data being stored in the flash memory 54. For example, if the user selects one or more music collections from the HDD 15 of the recording/reproducing apparatus 10 storing files as shown in FIG. 6A and gives an instruction to send the selected music collections to the portable apparatus 50, these music collections are sent to the portable apparatus 50 with the structure shown in FIG. 5 retained without change. Namely, the transfer data include not only the plural pieces of music data constituting each music collection, but also the list ID, music collection managing data, and piece-of-music managing data. For example, if three music collections are selected for transfer to the portable apparatus 50, these music collections are music collection structure data MA1, MA2, and MA3 each constituted by the list ID, music collection managing data, plural pieces of piece-of-music managing data, and music data as shown in FIG. 6B. These music collection structure data MA1, MA2, and MA3 are transferred to the portable apparatus 50 to be stored in the flash memory 54. Therefore, as shown in FIG. 6C, the flash memory 54 stores the list ID, music collection managing data, piece-of-music managing data, and music data as with the HDD 15, thereby storing each piece of music data in the state in which the music data are managed as music collections as shown in FIG. 5.

Thus, with the recording/reproducing apparatus 10 and the portable apparatus 50 according to the invention, the plural pieces of music data managed as music collections in the HDD 15 of the recording/reproducing apparatus 10 are transferred to the portable apparatus 50 with the managing form as a music collection retained, namely, as containing the list ID, music collection managing data, and piece-of-music managing data. Therefore, the portable apparatus 50 can manage plural pieces of music with the concept as a music collection retained, thereby allowing the reproduction of music data on a music collection basis. It is also practicable, if the portable apparatus 50 stores many pieces of music data as plural music collections in the flash memory 54, that these many pieces of music data are reproduced as music collections.

And now, if the transfer of data from the recording/reproducing apparatus 10 to the portable apparatus 50, namely, the copying or moving of pieces of music or collections of music is permitted unconditionally, the copyright of the copied or moved music data may be violated. To prevent this problem from happening, the present invention controls the copying or moving pieces of music or music collections in accordance with various conditions and situations. The following describes specific examples of this control.

(6) Transfer of a Piece of Music from the Recording/Reproducing Apparatus to the Portable Apparatus:

In the present embodiment, the recording/reproducing apparatus 10 can copy or move the music data stored in the HDD 15 to the flash memory 54 of the portable apparatus 50 in units of a piece of music or a collection of music. First, the copying of moving of music data on a music piece basis by the recording/reproducing apparatus 10 will be described.

It should be noted that the copying of data denotes that, after music data have been transferred from a source device to a destination device, the music data still remain on the source device and can be reproduced there. On the other hand, the moving of data denotes that, after music data have been transferred from a source device to a destination device, the transferred music data do not remain on the source device any more and therefore the transferred data cannot be reproduced on the source device.

Whether music data are to be copied or moved is determined by the user, the copyright protection agreements, and the system design concept based on the agreements. For example, if the copying of music data from the HDD 15 to another recording medium is permitted up to three times, the music data can be copied up to three times and then they can be only moved. Obviously, such a restriction may be set in accordance with the types of destination recording media.

Herein, "transfer" is used as a generic term for copying and moving. In what follows, for the transfer from the HDD 15 to the flash memory 54, only the moving is permitted by way of example. These restrictions in the transfer of music data are processed on the basis of the send counters CTm and CTa. However, if the decision process based on these send counters CTm and CTa is modified in the processing examples shown in FIGS. 7 through 12, the music data can be copied once or more.

Now, referring to FIG. 7, the transfer of music data from the HDD 15 to the flash memory 54, namely from the recording/reproducing apparatus 10 to the portable apparatus 50, will be described by way of example. It should be noted that, in this example, one or more pieces of music data are transferred, but this transfer is not of a music collection.

The processing shown in FIGS. 7 through 12 is executed by the CPU 11 of the recording/reproducing apparatus 10 only by way of example. Further, if the transfer control is executed by the cooperation between the CPU 11 of the recording/reproducing apparatus 10 and the CPU 51 of the portable apparatus 50, the control operation by the CPU 51 may be preferred over that by the CPU 11 if the user operates the portable apparatus 50. Further, it is supposed that both the recording/reproducing apparatus 10 and the portable apparatus 50 be interconnected for data communication before the transfer processing starts.

In step F101 of FIG. 7, when the user operates the keyboard 90, the remote commander 91, or the operator panel 20 (hereinafter generically referred to as an operator's control means) to select one or more pieces of music data from the music data stored in the HDD 15 and instructs the CPU 11 to send the selected music data to the flash memory 54, the CPU 11 starts transferring the selected music data.

In step F102, the CPU 11 decodes the piece-of-music managing data for one of the selected music data. In step F103, the CPU 11 determines whether the send counter CTm written in the piece-of-music managing data is "0" or not.

If the send counter CTm is found "0", then in step F104, the CPU 11 sets the send counter CTm to "1". Then, in step F106, the CPU 11 sets the music data corresponding to these piece-of-music managing data as the data enabled for transfer. For example, 2 bits of the additional information of the piece-of-music managing data may be allocated as transfer setting bits. The meanings of these transfer setting bits may be determined in advance; for example, "00"=transfer not set, "01"=transfer enabled, and "10"=transfer disabled.

On the other hand, if the send counter CTm is found "1" in step F103, then, in step F105, the CPU 11 determines that the music data corresponding to these piece-of-music managing data are disabled for transfer; namely the transfer setting bits are set to "10".

In step F103, the send counter CTm="1", which denotes that these music data were transferred in the past and have not been returned to the recording/reproducing apparatus 10 by the return processing to be described later. In this transfer processing, such music data cannot be transferred. In other words, these music data were moved and therefore do not exist on the HDD 15.

After the transfer is disabled in step F105 or enabled in step F106, if another piece of the selected music data is still found in step F107, the CPU 11 returns from step F107 to step F102, executing the above-mentioned processing on these remaining music data and their piece-of-music managing data.

When all of the music data selected by the user have been processed in steps F102 through F106, the CPU 11 proceeds to step F108. In step F108, the CPU 11 extracts the music data enabled for transfer in step F106 and their piece-of-music managing data, namely the piece-of-music managing data of which transfer setting bits are "01", generates the transfer data, and sends the generated transfer data to the portable apparatus 50. The transfer data are constituted by piece-of-music managing data and corresponding music data.

The portable apparatus 50 stores the supplied one or more pieces of music data and their piece-of-music managing data into the flash memory 54. To be more specific, under the control of the CPU 51 of the portable apparatus 50, the piece-of-music managing data are stored in the managing data area of the flash memory 54 and the music data in the data area thereof. Further, the CPU 51 rewrites the Audio ID of the piece-of-music managing data so that the Audio ID points at the start memory address of the music data to be recorded in the data area of the flash memory 54. If an identifier is attached to the start of the music data in advance and the Audio ID is pointing at this identifier, this rewriting of the audio ID is unnecessary. In this case, when the user accesses desired music data on the portable apparatus 50, the CPU 51 sequentially scans the flash memory 54 for the identifier pointed at by the Audio ID, thereby accessing the specified music data.

When the transfer has been completed, the transfer setting bits are set to "00" under the control of the CPU 11 and the CPU 51. Consequently, the portable apparatus 50 can reproduce one or more pieces of music data on a music piece basis stored in the flash memory 54 as the reproduction is specified by the user.

Figure 8:
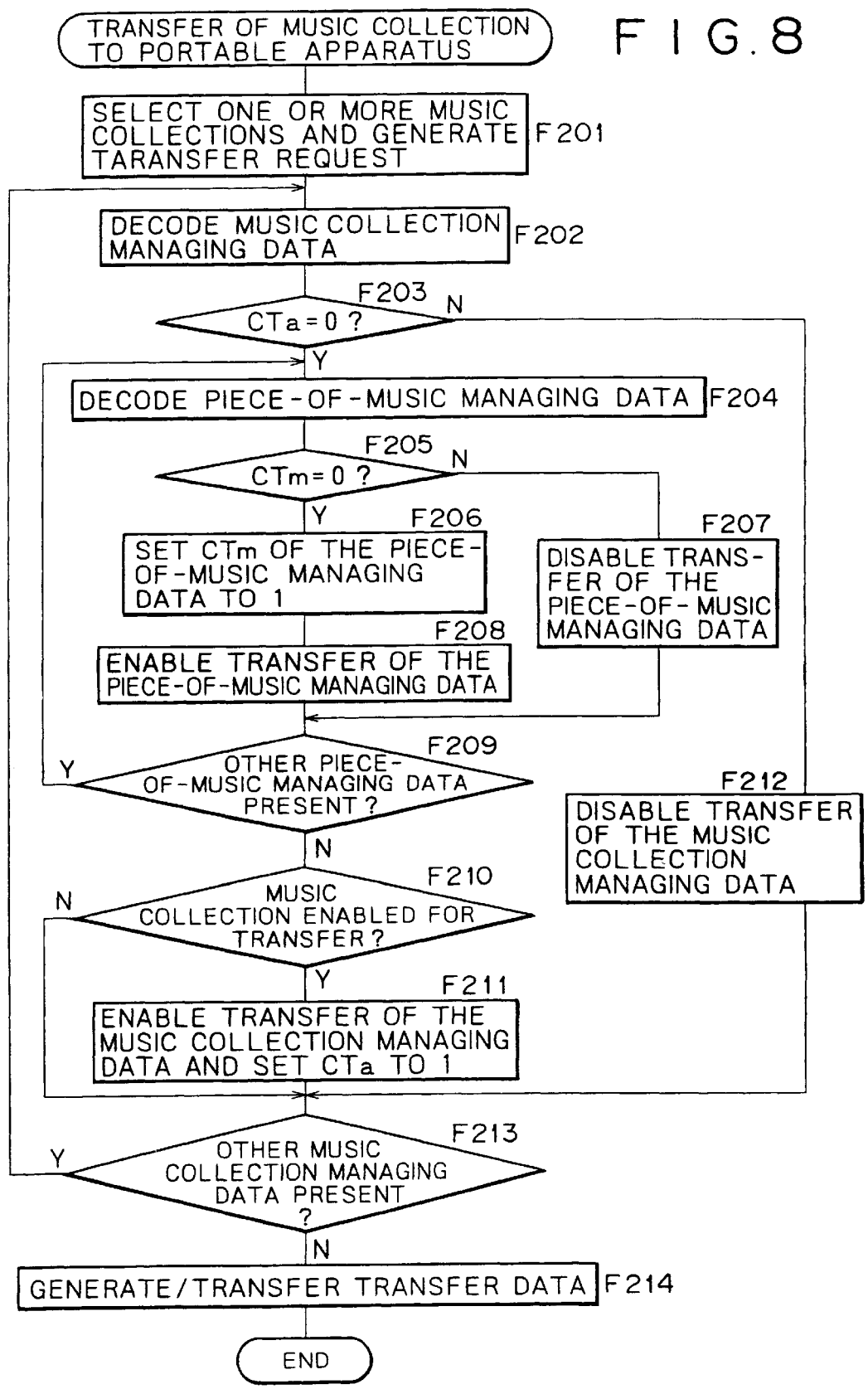
FIG. 8 is another flowchart describing the transfer processing for a music collection from the above-mentioned recording/reproducing apparatus to the portable apparatus.

(7) Transfer of a Music Collection from the Recording/Reproducing Apparatus to the Portable Apparatus:

The following describes the processing for transferring one or more pieces of music data on a music collection basis from the HDD 15 to the flash memory 54 with reference to FIG. 8.

In step F201 of FIG. 8, when the user operates the operator's control means to select one or more pieces of music collections from the music data stored in the HDD 15 and instructs the CPU 11 to send the selected music collections to the flash memory 54, the CPU 11 starts transferring the selected music data.

In step F202, the CPU 11 decodes the music collection managing data corresponding to one of the selected music collections. In step F203, the CPU 11 determines whether the send counter TCa written in the music collection managing data is "0" or not.

If the send counter CTa is found "1", it indicates that this music collection was transferred in the past and has not been returned to the recording/reproducing apparatus 10 by the return processing to be described later. This music collection is set as music collection disabled for transfer in step F212. Namely, this music collection is handled as currently nonexistent on the HDD 15. This handling can be implemented by setting 2 bits of the additional information of the music collection managing data for example as music collection transfer setting bits. The meanings of these transfer setting bits may be determined in advance; for example, "00"= transfer not set, "01"=transfer enabled, and "10"=transfer disabled.

On the other hand, if the send counter CTa is found "0", in step F203, then the CPU 11 checks the individual piece of music data contained in this music collection in steps F204 through F209.

In step F204, the CPU 11 decodes the piece-of-music managing data derived from one music ID (MID) written in these music collection managing data. In step F205, the CPU 11 determines whether the send counter CTm written in the managing data is "0" or not.

If the send counter CTm is found "0", then the CPU 11 sets the send counter CTm to "1" in step F206. In step F208, the CPU 11 enables for transfer the music data corresponding to these piece-of-music managing data. To implement this setting, 2 bits of the additional information of the piece-of-music managing data may be allocated for the music transfer setting bits. The meanings of these transfer setting bits may be determined in advance; for example, "00"=transfer not set, "01"=transfer enabled, and "10"= transfer disabled.

On the other hand, if the send counter CTm is found "1" in step F205, the CPU 11 disables for transfer the music data corresponding to these piece-of-music managing data in step F207. Namely, the CPU 11 sets the music transfer setting bits to "10".

For example, if the music data were transferred in the past by the transfer processing on a music piece basis, it is possible that not a music collection but a certain piece contained therein was transferred. In such a case, the CPU 11 proceeds to step F207.

After the transfer is disabled in step F207 or enabled in step F208, if another piece of the selected music data is still found in this music collection, the CPU 11 returns from step F209 to step F204, executing the above-mentioned processing on these remaining music data and their piece-of-music managing data. Namely, the CPU 11 executes the transfer enable or disable processing on all pieces of music data (and the piece-of-music managing data) contained in this music collection (and the music collection managing data) in steps F204 through F209.

When all pieces of music data in the music collection have been enabled or disabled for transfer, the CPU 11 determines in step F210 whether this music collection is enabled for transfer. It is assumed here that the music collection be enabled for transfer if it contains at least one piece of music data enabled for transfer. On the other hand, if all pieces of music data in this music collection were disabled for transfer in step F207, this music collection is disabled for transfer.

If this music collection is enabled for transfer, the CPU 11 sets the send counter CTa in the music collection managing data to "1" in step F211, enabling for transfer the music collection corresponding to these music collection managing data. Namely, the CPU 11 sets the music collection transfer bits to "01".

Thus, the transfer of one music collection was enabled or disabled in steps F202 through F211 or F212. If the user also selected another music collection in step F201, then the CPU 11 returns from step F213 to step F202 and executes the above-mentioned processing operations on this music collection.

When the processing operations of steps F202 through F211 or F212 have been executed on all the user-selected music collections, then the CPU 11 proceeds from step F213 to step F214.

Next, the CPU 11 extracts, from the music collection enabled for transfer in step F211, namely the music collection of which music collection transfer bits are set to "01", the list ID, the music collection managing data, the music data contained in the music collection, and the piece-of-music managing data corresponding to these music data, thereby generating transfer data. However, if the music collection enabled for transfer contains any music data disabled for transfer in step F207, the CPU 11 generates the transfer data without the music data disabled for transfer and the piece-of-music managing data corresponding to the disabled music data. Namely, the CPU 11 scans the music transfer bits of the piece-of-music managing data specified by the music collection managing data enabled for transfer to extract the music data of which music transfer bits are "01" and generates the transfer data accordingly.

The transfer data are generated as a data group of one or more music collections having a music collection structure containing a list ID through each piece of music data, namely the structure shown in FIG. 6B. The CPU transfers the generated transfer data to the portable apparatus 50. The portable apparatus 50 stores all data of one or more music collections contained in the supplied transfer data into the flash memory 54. Namely, the transfer data are stored in the flash memory 54 as shown in FIG. 6C.

To be more specific, under the control of the CPU 51 of the portable apparatus 50, the list ID, the music collection managing data, and the piece-of-music managing data are stored in the managing data area of the flash memory 54 and the music data into the data area thereof. The list ID, the music collection managing data, and the piece-of-music managing data are recorded in corresponding managing areas arranged as shown in FIG. 6C. Further, the CPU 51 rewrites the list ID so that it points at the start memory address of music collection managing data to be recorded in the music collection managing data area. In addition, the CPU 51 rewrites the piece-of-music ID in the music collection managing data so that it points at the start memory address the piece-of-music managing data to be recorded in the piece-of-music managing data area. Moreover, the CPU 51 rewrites the Audio ID of the piece-of-music managing data so that it points at the start memory address of the music data to be recorded in the data area of the flash memory 54.

If the music collection managing data, the piece-of-music managing data, and the music data are prefixed with their identifiers in advance and the list ID, the piece-of-music ID, and the Audio ID point at these identifiers respectively, the list ID, the piece-of-music ID, and the Audio ID need not be rewritten. In accessing a desired data on the portable apparatus 50, the CPU 51 sequentially scans the flash memory 54 for the identifiers indicated by the list ID, the piece-of-music ID, and the Audio ID corresponding to the desired piece of music data.

When the above-mentioned transfer of the music collection has been completed, the music collection transfer setting bits and the piece-of-music transfer setting bits are all reset to "00" under the control of the CPU 11 and the CPU 51.

Consequently, the portable apparatus 50 is ready for reproducing, on a music collection basis, one or more music collections stored in the flash memory 54, as instructed by the user. Various reproducing forms on the portable apparatus 50 will be described later.

In the processing example described with reference to FIG. 8, if that music collection contains any piece of music data disabled for transfer, the other pieces of music data enabled for transfer are gathered into a music collection for transfer. Various modifications are possible for enabling or disabling music collections for transfer as will be described below.

Figure 9:
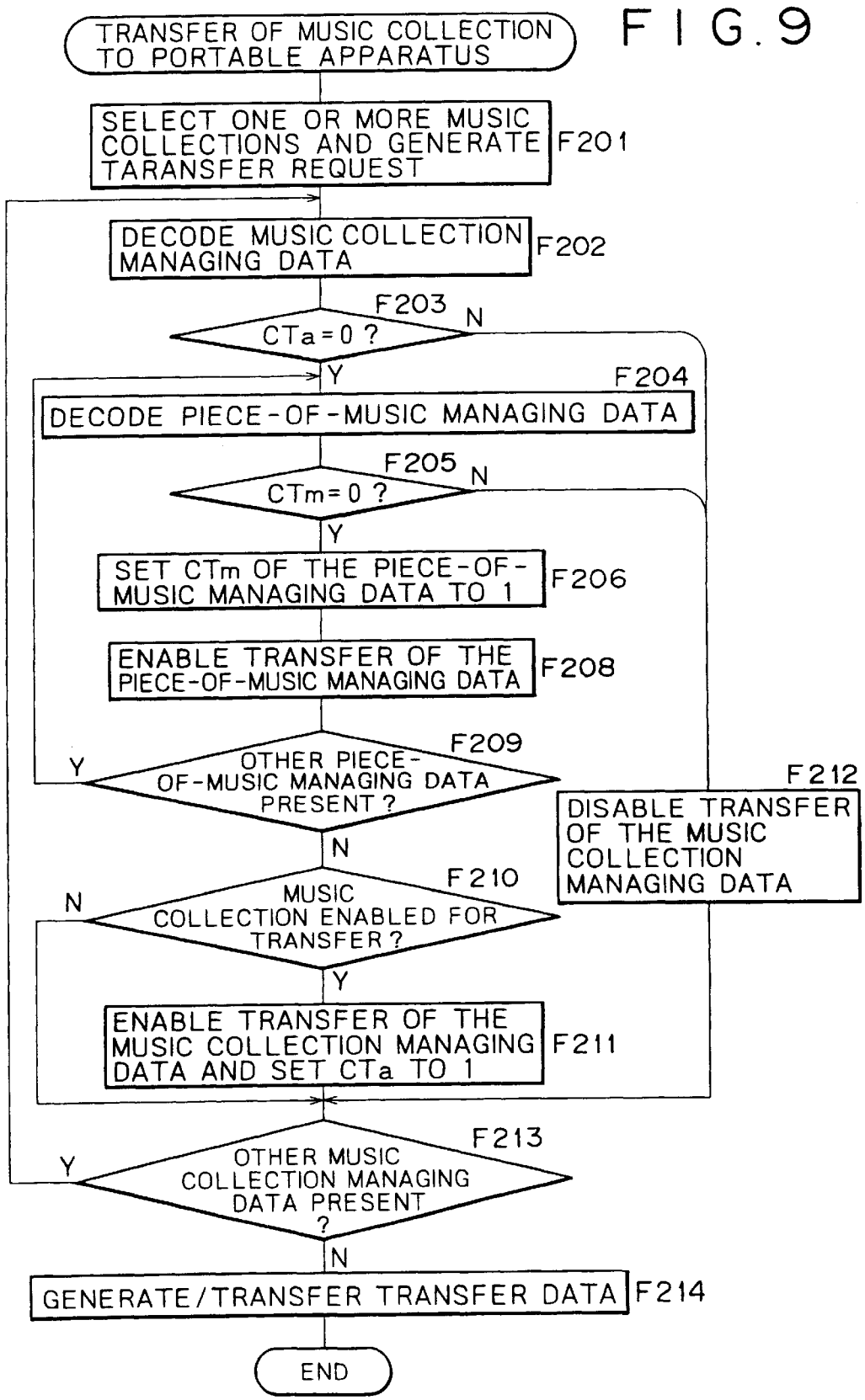
FIG. 9 is still another flowchart describing the transfer processing for a music collection from the above-mentioned recording/reproducing apparatus to the portable apparatus.

Referring to FIG. 9, there is shown a flowchart that described one of such modifications. It should be noted that, with reference to FIG. 9, the processing operations similar to those previously described with reference to FIG. 8 are denoted by the same step numbers and the descriptions of these steps will be skipped.

The difference between the processing example of FIG. 9 and the processing example of FIG. 8 lies in that there is no processing corresponding to step F207 of FIG. 8. Therefore, if the piece-of-music managing data of which send counter CTm="1" corresponding to a certain piece of music data in the music collection are found in step F205, the CPU 11 proceeds directly to step F212 to disable for transfer this music collection itself. Namely, the music collection transfer setting bits are set to "10". This means that if at least one piece of music data transferred in the past is contained in this music collection, its transfer as a collection is disabled.

According to this processing example, a certain music collection is enabled for transfer only when it retains a compliant form of recorded music. Consequently, every music collection is transferred to the portable apparatus 50 always in the state of original recorded music and the portable apparatus 50 always reproduce every supplied music collection as a music collection of compliant recorded music.

Figure 10:
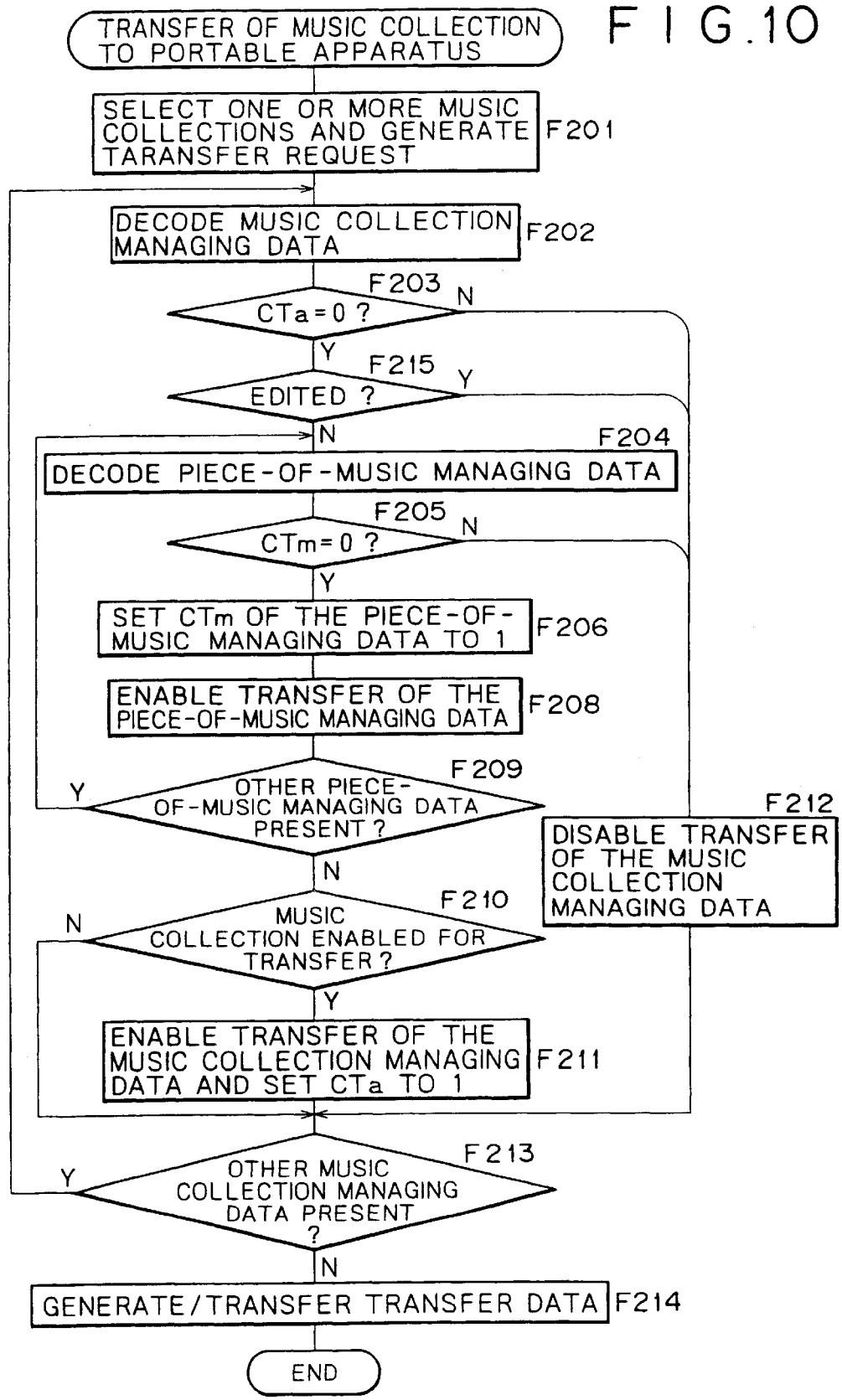
FIG. 10 is yet another flowchart describing the transfer processing for a music collection from the above-mentioned recording/reproducing apparatus to the above-mentioned portable apparatus.

Referring to FIG. 10, there is shown a flowchart that describes another modification. It is possible in the recording/reproducing apparatus 10 that the user edits the music collection managing data as desired. To be more specific, the music collection managing data shown in FIG. 5 contains piece-of-music IDs (MIDs) as a list of music pieces included in the music collection, each piece-of-music ID (MID) corresponding to each piece of piece-of-music managing data. The sequence of these piece-of-music IDs (MIDs) corresponds to the sequence of the music pieces in the music collection.

Therefore, the user can change the sequence of music pieces by changing the sequence of the piece-of-music IDs (MID1, MID2, and so on). In addition, the user can delete a particular piece of music from the music collection by deleting the corresponding piece-of-music ID. Likewise, the user can add piece-of-music managing data indicated by an added piece-of-music ID to this music collection, thereby adding the music data corresponding to these piece-of-music managing data. Also, the user can change the titles of music collection and music piece by changing the title data in the music collection managing data and the title in the piece-of-music managing data.

The music collection thus edited does not retain its original form. Therefore, from the standpoint of copyright holders, it is not desirable that such user-edited music collections are transferred to other recording media.

This may require another processing example in which user-edited music collections can be reproduced only on the recording/reproducing apparatus 10 and therefore prevented from being transferred to the portable apparatus 50 and other devices.

In this example, if a certain music collection is edited by the user in some way or another, the CPU 11 sets a flag indicative of the editing, as additional information to the music collection managing data corresponding to the edited collection. On the basis of this flag attaching processing, the music collection transfer processing as shown in FIG. 10 can be provided.

With reference to FIG. 10, the processing operations similar to those previously described with reference to FIG. 9 are denoted by the same step numbers and the descriptions of these steps will be skipped. The processing example shown in FIG. 10 is obtained by adding the processing of step F215 to the processing example shown in FIG. 9. To be more specific, if the send counter CTa of the music collection managing data is found not "0" in step F203 or the flag indicative that the music collection managing data have been edited is set or the music data disabled for transfer are found included in step F205, then this music collection is disabled for transfer.

The above-mentioned processing prevents any user-edited music collection from being transferred to the portable apparatus 50. Therefore, each music collection is enabled for transfer only when it retains compliant form including the original sequence in which the pieces of music in the collection are arranged. This allows each music collection to be transferred to the portable apparatus 50 always in the original form and to be reproduced on the portable apparatus 50.

As described, the example shown in FIG. 10 is obtained by adding the decision of whether the editing has been executed on the music collection managing data to the example shown in FIG. 9. It will be apparent to those skilled in the art that a processing example in which this decision step is added to the processing example shown in FIG. 8 is also possible.

It should be noted that the CPU 11 backs up, in a predetermined area of the HDD 15, the default music collection managing data and the default piece-of-music managing data when each music collection is recorded on the HDD 15 of the recording/reproducing apparatus 10.

Every time the user executes an editing operation, the CPU 11 compares the edited managing data with the backup managing data. When a match is found, the CPU 11 resets the above-mentioned flag in the additional information of the music collection managing data.

Figure 7:
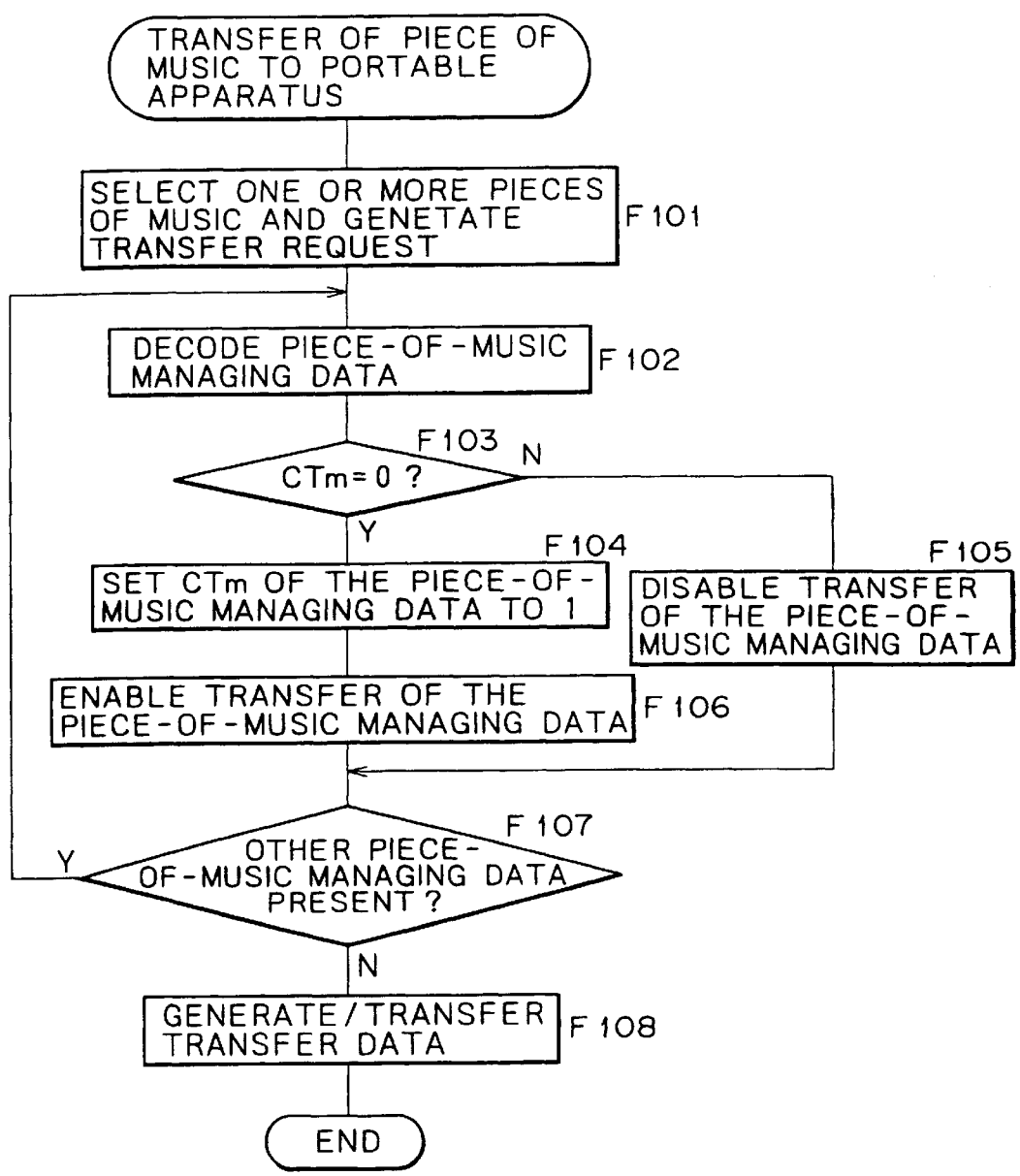
FIG. 7 is a flowchart describing the transfer processing for a piece of music from the above-mentioned recording/reproducing apparatus to the above-mentioned portable apparatus.

(8) Return of a Piece of Music from the Portable Apparatus to the Recording/Reproducing Apparatus:

According to the processing examples shown in FIGS. 8 through 10, if a certain piece of music data in a certain music collection was transferred to the portable apparatus 50 by the processing shown in FIG. 7, this piece of music data or this music collection itself is disabled for further transfer.

However, if the music data transferred to the portable apparatus 50 are returned from the flash memory 54 to the HDD 15 by the return processing described below, the returned music data are handled as existent in the HDD 15 again and therefore the returned music data or the music collection containing them is enabled for transfer to the portable apparatus 50.

Figure 11:
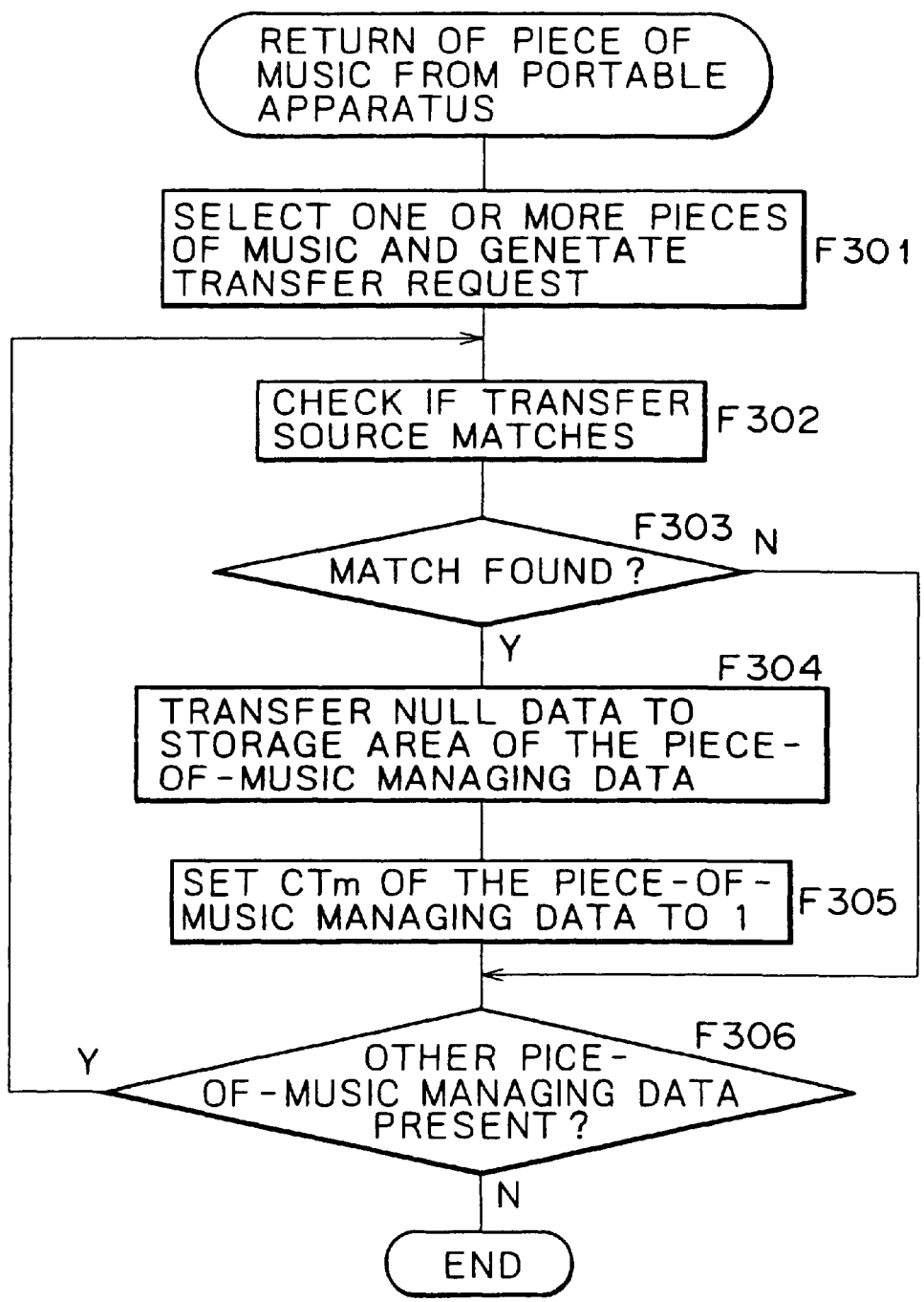
FIG. 11 is a flowchart describing the transfer processing for a music piece from the above-mentioned portable device to the above-mentioned recording/reproducing apparatus.

Referring to FIG. 11, there is shown a return processing to be executed on a piece of music basis. When the user specifies, through the operator's control means, one or more pieces of music data stored in the flash memory 54 of the portable apparatus 50 to return the specified music data to the HDD 15, the CPU 11 receives the return instruction in step F301, starting the return processing in step F302.

In step F302, the CPU 11 checks if the music data recorded in the flash memory 54 of the portable apparatus 50 and specified by the user for return was transferred from the recording/reproducing apparatus 10. Namely, the CPU 11 confirms that the music data were not transferred to the flash memory 54 from another recording/reproducing apparatus or another device.

To implement this confirmation processing, the session number recorded as the additional information of the piece-of-music managing data or the music collection managing data corresponding to these music data may be checked. For example, although the description was skipped in the processing examples shown in FIGS. 7 through 10, when transferring music data on a piece-of-music basis or a music collection basis from the recording/reproducing apparatus 10 to the portable apparatus 50, a session number indicative of the entity of the portable apparatus 50 is added to the additional information of the piece-of-music managing data or the music collection managing data which are transferred with the music data.

Inclusion of the session number in the additional information allows the CPU 11 to determine in step F302 whether the music data to be returned were transferred from the recording/reproducing apparatus 10 by checking the session number in the piece-of-music managing data or the music collection managing data stored in the flash memory 54. It should be noted that the session number is unique to every recording/reproducing apparatus 10 and stored in the ROM 12 for example before being shipped from factory.

Figure 12:
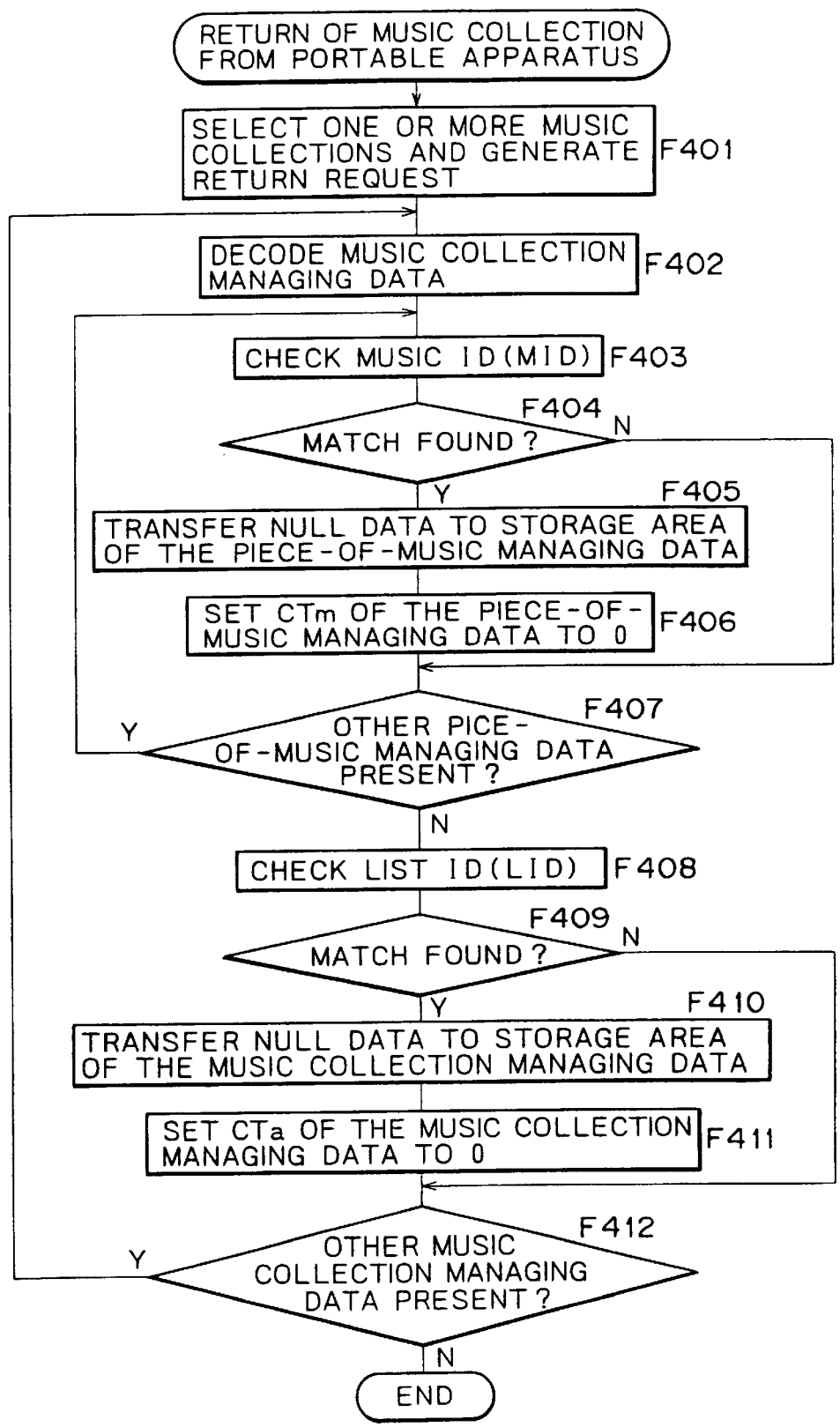
FIG. 12 is a flowchart describing the return processing for a music collection from the above-mentioned portable apparatus to the recording/reproducing apparatus.

It should be noted that FIG. 12 shows an example in which the transfer source is checked by piece-of-music ID (MID), which may also be used in the processing example shown in FIG. 11.

If the session number of the CPU 11 matches the session number of the music data specified by the user and therefore the CPU 11 can confirm the these music data were transferred from the recording/reproducing apparatus 10, then the CPU 11 proceeds from step F303 to F304, transferring null data to the managing data area in the flash memory 54 in which the piece-of-music managing data corresponding to the music data specified for return are stored. The null data denote invalid data or zero data for example.

Namely, transfer of the null data deletes the piece-of-music managing data from the flash memory 54. When the piece-of-music managing data are deleted, the corresponding music data are disabled for reproduction. It is not necessary, therefore, to delete the music data corresponding to the piece-of-music managing data. As required, however, the null data may be transferred to the storage area of the music data to delete them.

In step F305, the CPU 11 resets, on the HDD 15, the send counter CTm to "0" in the piece-of-music managing data for the music data specified for return. Consequently, on the HDD 15, these music data are returned to the state in which they are regarded as existing, thereby completing the return of the music data from the flash memory 54 to the HDD 15.

If the user specifies the return of plural pieces of music data, the CPU 11 returns from step F306 to step F302 and executes the above-mentioned processing for the remaining piece or pieces of music data.

If the recording/reproducing apparatus 10 is found, in step F303, not the transfer source apparatus to which the music data are returned by the user, these music data are not processed for return in steps F304 and F305.

Thus, the return processing shown in FIG. 11 returns, in appearance, the specified music data from the flash memory 54 to the HDD 15. Consequently, if the user wants to transfer a music collection from the HDD 15 to the flash memory 54 after transferring one piece included herein from to the flash memory 54, the piece apparently returned to the HDD 15 may be transferred by the processing shown in FIGS. 8 through 10, thereby transferring the music collection itself.

(9) Return of a Piece of Music Collection from the Portable Apparatus to the Recording/Reproducing Apparatus:

The following describes the processing for returning music data on a music collection basis from the flash memory 54 to the HDD 15 with reference to the flowchart shown on FIG. 12. When the user specifies one or more music collection stored in the flash memory 54 of the portable apparatus 50 by operating the operator's control means of the recording/reproducing apparatus 10 and gives an instruction to the CPU 11 to return the specified one or more music collections to the HDD 15, the CPU 11 receives the instruction in step F401, starting the return processing in step F402.

In step F402, the CPU 11 decodes the music collection managing data for one of the collections recorded in the flash memory 54 of the portable apparatus 50 and specified by the user for return.

In steps F403 through F406, the CPU 11 checks the contents of the decoded music collection. To be more specific, the CPU 11 checks the piece-of-music ID (MID) in step F403 to determine whether this ID matches the piece-of-music ID (MID) of the music collection managing data in the HDD 15. It should be noted that the present return processing is applied to the above-mentioned transfer processing in which the piece-of-music ID, which has been transferred from the HDD 15 to the flash memory 54, is not rewritten.

If a match is found between the piece-of-music IDs, the CPU 11 proceeds from step F404 to F405 and transfers null data to the managing data area in the flash memory 54 in which the piece-of-music managing data indicated by that piece-of-music ID (MID) are stored, deleting these piece-of-music managing data from the flash memory 54. In step F406, the CPU 11 resets, on the HDD 15, the send counter CTm to "0" in the piece-of-music managing data equivalent to the piece-of-music managing data deleted from the flash memory 54.

The CPU 11 repeats the above-mentioned processing operations until it is determined in step F407 that there is not more piece-of-music managing data to be processed. It should be noted that, if no match is found in step F404, the piece-of-music managing data indicated by the mismatching piece-of-music ID (MID) are not deleted from the flash memory 54.

Thus, by the processing operations shown in steps F403 through F407, the piece-of-music managing data included in a music collection specified for return are deleted from the flash memory 54 and returned to the HDD 15.

In step F408, the CPU 11 checks the list ID for the piece-of-music managing data to be currently processed stored in the flash memory 54. In step F409, the CPU 11 checks if this list ID matches the list ID on the HDD 15. It should be noted that the present return processing is applied to the above-mentioned transfer processing in which, when the list ID has been transferred and recorded from the HDD 15 to the flash memory 54, this list ID is not rewritten.

When a match is found between the list IDs, the CPU 11 proceeds from step F409 to step F410 and transfers null data to the managing data area in the flash memory 54 in which the music collection data to be processed are stored, deleting them from the flash memory 54. In step F411, the CPU 11 resets, on the HDD 15, the send counter CTa to "0" which included in the music collection managing data equivalent to the music collection managing data deleted from the flash memory 54. Now, the apparent return of the music collection specified for return to the HDD 15 has been completed.

In step F412, if the user specified plural music collections in step F401, the CPU 11 checks if there remain any music collections not yet processed. If a music collection not yet processed is found, then the CPU 11 returns to step F402 to execute the above-mentioned processing operations on that music collection. When all specified music collections have been processed, this return processing comes to an end from step F412.

The above-mentioned processing allows the apparent return of music collections from the flash memory 54 to the HDD 15.

It should be noted that the above-mentioned piece-of-music ID and list ID are dependent on information sources; for example, within a same piece of information content, different IDs are assigned to different information source media. In the present embodiment, for example, the piece-of-music ID and list ID may be rewritten to the ID for the recording/reproducing apparatus 10 at the time when a music collection corresponding to the list ID is recorded to the HDD 15 of the recording/reproducing apparatus 10. If the recording/reproducing apparatus 10 records a music collection from a CD and different piece-of-music IDs and, within a same piece of information content, different list IDs are assigned to different CDs beforehand, no ID rewriting is required for the recording/reproducing apparatus 10 at the time when recording the music collection to the HDD 15.

In the present return processing, the matching between the piece-of-music IDs and the list IDs is checked, so that the music data are correctly returned from the flash memory 54 to the HDD 15.

The apparent return of music collections allows the subsequent transfer of the returned music collections to the flash memory 54 or other recording media.

If a match is found between the piece-of-music IDs of only some of the pieces of music contained in a music collection while a mismatch is found for the other pieces of music, it means that only a part (music data) of the music collection has been transferred from the HDD 15 while the other (piece-of-music managing data) and the music collection managing data have been transferred a recording medium such as another HDD. In this case, only the piece-of-music managing data having the matching piece-of-music ID (MID) and the corresponding music data are returned. Consequently, in a state in which music collections have been transferred from various recording media to the flash memory 54, the transfer and return relationship between the HDD 15 and the flash memory 54 can be maintained correctly.

It should be noted that the confirmation of the matching for transfer source may also be realized by checking the match in the session number assigned to the music collection managing data or the piece-of-music managing data as described with reference to FIG. 11.

In the processing examples shown in FIGS. 11 and 12, the user specifies the return processing by operating the recording/reproducing apparatus 10. It will be apparent to those skilled in the art that the user may operate the portable apparatus 50 to achieve the same purpose.

In the transfer and return processing operations described with reference to FIGS. 7 through 12, the transfer or return of music data is enabled or disabled by the values of the send counters CTa and CTm. Especially, the examples have been described in which, when the send counter CTa is "1", the music collection concerned is disabled for transfer and, when the send counter CTm is "1", a piece of music concerned or a music collection containing the piece of music is disabled for transfer. However, as described, these processing examples are based on the premise that the movement of music data from the HDD 15 to the flash memory 54 is permitted only once.

For example, if it is premised that music data can be copied up to three times from the HDD 15 to another recording medium, the transfer is enabled until the values of the send counters CTa and CTm each reach 3. Obviously, every time a return processing operation is executed, the values of the send counters CTa and CTm are decremented by 1 for the returned music collection or piece of music.

Figure 13:
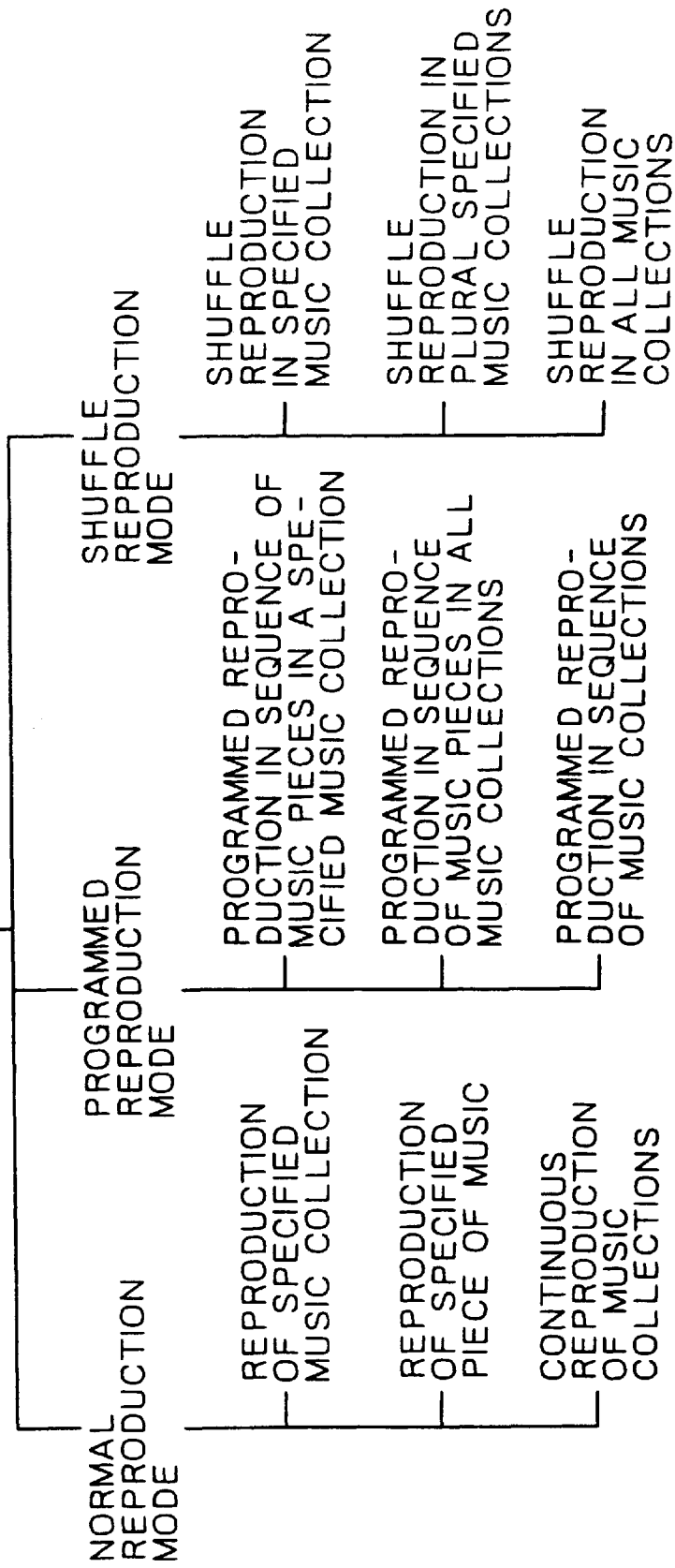
FIG. 13 illustrates various reproducing operations in the above-mentioned portable apparatus.

(10) Reproducing Operations of the Portable Apparatus:

The following describes the reproducing operations enabled on the portable apparatus 50 to which a music collection has been transferred. Assume that the flash memory 54 of the portable apparatus 50 store data having a managing structure as a music collection as shown in FIG. 6C, then the portable apparatus 50 can execute various reproducing operations as shown in FIG. 13.

The reproduction operation modes provided by the present embodiment may be normal reproduction, programmed reproduction, and shuffle reproduction.

The normal reproduction includes the reproduction of a specified music collection, the reproduction of a specified piece of music, and the continuous reproduction of music collections.

The reproduction of a specified music collection starts when the user specifies one or more music collections recorded in the flash memory 54. Namely, when the user specifies one or more music collections, the pieces of music contained in them are reproduced in the normal order.

The CPU 51 of the portable apparatus 50 references the music collection managing data of the specified music collection or music collections and, on the basis of one or more piece-of-music IDs (MIDs) written in these music collection managing data, executes the reproduction of the pieces of music in the order of these piece-of-music IDs (MID1, MID2, and so on). Namely, the CPU 51 sequentially reproduces the music data corresponding to the piece-ofmusic managing information indicated by the piece-of-music IDs. Consequently, the reproduction of a music collection or collections is executed as a normal music album or albums.

It should be noted that, if only one music collection is stored in the flash memory 54, the pieces of music contained in it are reproduced in the normal order also when the user executes a reproducing operation with no music collection specified.

The reproduction of a specified piece of music starts when the user specifies a certain piece of music data of one or more pieces of music data stored in the flash memory 54. Namely, when the user specifies music data (piece-of-music managing data), the CPU 51 reproduces the music data corresponding to these piece-of-music managing data. Consequently, only the piece of music specified by the user is reproduced.

The continuous reproduction of music collections is executed when the user executes a reproducing operation without specifying any music data. In this mode, the CPU 51 execution the reproduction starting with the first music collection indicated by the list ID (LDI1). The pieces of music contained in each music collection are reproduced in the normal order.

To be more specific, the CPU 51 first references the first music collection managing information from the list ID (LID1) and, in accordance with the sequence of the piece-of-music IDs in this first music collection managing information, reproduces each piece of the music data in this collection. When this reproduction has been completed, the CPU 51 references the second music collection managing information from the list ID (LID2) and, in accordance with the sequence of the piece-of-music IDs in this second music collection managing information, reproduces each piece of music data in this collection. The CPU 51 repeats the above-mentioned operations until the last list ID. Consequently, one or more music collections are sequentially reproduced in the order of the list IDs.

In the programmed reproducing mode, the music data are reproduced in an order programmed by the user. The programmed reproduction mode includes the programmed reproduction in the sequence of the pieces of music contained in a specified music collection, the programmed reproduction in the sequence of music pieces contained in all music collections, and the programmed reproduction in the sequence of music collections, for example.

The programmed reproduction in the sequence of the pieces of music contained in a specified particular music collection is executed when the user specifies the particular music collection stored in the flash memory 54 and then specifies the reproduction sequence of the pieces of music contained in the specified music collection. Namely, the CPU 51 captures the specifications by the user of music pieces and their reproduction sequence, references the corresponding music collection managing data and piece-of-music managing data, and reproduces the specified music data in the specified order.

The programmed reproduction in the sequence of music pieces contained in all music collections is executed when the user selects desired pieces of music over all music collections stored in the flash memory 54 and then specifies the sequence of reproducing the specified pieces of music. Namely, a program specifying the reproduction sequence of the specified pieces of music is executed on all music collections stored in the flash memory 54.

The CPU 51 captures the specification by the user of the reproduction sequence, references the corresponding music collection managing data and piece-of-music managing data, and reproduces the specified pieces of music in the specified order.

This processing, with respect to conventional recording media such as CD and MD, is equivalent to an operation in which the specified pieces of music are reproduced in the specified order by seamlessly changing two or more recording media, or two or more music albums. This is therefore conventionally realized only with so-called changer systems comparatively large in equipment size and sophisticated in operational control. On the contrary, the portable apparatus 50 stores plural music collections in the flash memory 54, so that no time is required for changing recording media between pieces of music, thereby making the transition in reproduction between pieces of music faster than the changer systems.

The programmed reproduction in the sequence of music collections is executed when the user specifies the reproduction sequence on a music collection basis. Namely, when the user specifies the sequence of music collections, the CPU 51 reproduces the music collections in the specified sequence. This processing, with respect to recording media such as CD and MD, is also equivalent to an operation in which two or more recording media are changed and reproduced in the specified order. This is conventionally realized only with so-called changer systems. Obviously, with the portable apparatus 50, the reproduction can be continued more easily and faster than the conventional changer systems.

In addition to the above-mentioned programmed reproduction modes, the present embodiment provides the programmed reproduction of music pieces and music collections in which the user specifies a sequence of music collections and then the user further specifies a sequence of music pieces in each music collection.

In the shuffle reproduction mode, the CPU 51 selects music pieces or music collections at random and sequentially reproduces the music data thus selected. The shuffle reproduction mode includes the shuffle reproduction in a specified music collection, the shuffle reproduction in plural specified music collections, and the shuttle reproduction in all music collections.

The shuffle reproduction in a specified music collection is executed when the user specifies a certain music collection stored in the flash memory 54 and then specifies the shuffle reproduction. The CPU 51 references the music collection managing data and the piece-of-music managing data corresponding to the specified music collection. Then, the CPU 51 selects at random the piece-of-music IDs written in the music collection managing data and reproduces the selected piece-of-music managing data, namely the music data. This shuffle reproduction allows the user to listen to the specified pieces of music in an unexpected order in the music collection.

The shuffle reproduction in plural specified music collections is executed when the user specifies plural music collections stored in the flash memory 54 and then specifies the shuffle reproduction. The CPU 51 references the music collection managing data corresponding to the specified plural music collections. Then, the CPU 51 selects the piece-of-music IDs at random in a range of these music collection managing data and reproduces the selected piece-of-music managing data, namely the music data. This shuffle-reproduction allows the user to listen to the selected pieces of music in an unexpected order in the specified plural music collections.

The shuffle reproduction in all music collections is executed to reproduce all music collections, namely all music data stored in the flash memory 54. The CPU 51 references the music collection managing data corresponding to all music collections, selects at random the piece-of-music IDs in a range described in all music collection managing data, and reproduces the selected piece-of-music managing data, namely the music data. This shuffle reproduction allows the user to listen to the pieces of music in an unexpected order in all music data stored in the flash memory 54.

As described, the portable apparatus 50 practiced as one preferred embodiment of the present invention stores music data in units of one or more music collections, so that various reproducing operations such as mentioned above can be realized on the basis of the concept of music collections. Obviously, the present embodiment does not store music collections in a manner in which one music collection is recorded on one CD or MD, so that the present embodiment does not require any rerecording media changing operations in implementing the above-mentioned various reproduction modes, thereby eliminating the necessity for a large-scale equipment configuration as the conventional media changing systems. Moreover, because no recording media changing operations are required, the present embodiment is free from the time loss otherwise incurred, thereby realizing a music reproducing environment more comfortable to users than the related-art counterpart.

It will be apparent to those skilled in the art that, in the addition to the above-mentioned capabilities, the present invention allows a introduction reproduction in which only the introductions of pieces of music are sequentially reproduced in one music collection for example or a repeated reproduction in which a certain music collection is repeatedly reproduced for example while retaining the framework of music collections.

While the preferred embodiments of the present invention have been described using specific terms, such description is for illustrative purposes only, and it is to be understood that changes and variations may be made without departing from the spirit or scope of the appended claims.

What is claimed is:

1. A portable recording and reproducing apparatus for receiving data and management data for managing said received data, recording said received data and said received management data to a recording medium, and reproducing said recorded data from said recording medium, comprising:

recording means for recording a received data group in a data area of a recording medium and group management data for managing said received data group in a management data area of said recording medium;

selecting means for selecting, in accordance with a user operation, said group management data to be recorded in said recording medium;

reproducing means for reproducing a plurality of data managed by said selected group management data; and control means for controlling said reproducing means so as to reproduce, in units of said received data group, said plurality of data managed by said selected group management data.

2. The portable recording and reproducing apparatus according to claim 1, wherein:

said selecting means can specify, in accordance with a user operation, a sequence of reproducing a plurality of said group management data recorded on said recording medium; and said control means controls said reproducing means so as to sequentially reproduce a plurality of data groups in accordance with said specified sequence.

3. The portable recording and reproducing apparatus according to claim 1, wherein:

said selecting means can specify at random in accordance with a user operation a sequence of reproducing a plurality of said group management data recorded in said recording medium; and said control means controls said reproducing means so as to reproduce at random a plurality of data groups corresponding to said plurality of said group management data in accordance with said specified random sequence.

4. The portable recording and reproducing apparatus according to claim 1, wherein:

said selecting means can specify, in accordance with a user operation, a sequence of reproducing single pieces of data managed by said group management data to be recorded on said recording medium; and said control means controls said reproducing means so as to sequentially reproduce said single pieces of data in accordance with said specified reproducing sequence.

5. The portable recording and reproducing apparatus according to claim 1, wherein:

said selecting means can specify at random in accordance with a user operation a sequence of reproducing single pieces of data managed by said group management data stored in said recording medium; and said control means controls said reproducing means so as to reproduce said single pieces of data in a random sequence.

6. A data transfer system comprising:

a recording/reproducing apparatus for recording/reproducing data to/from a first recording medium having a data area in which data are stored and a management data area in which management data for managing said data are stored, said recording/reproducing apparatus including first selecting means for selecting, in accordance with a user operation, group management data to be stored in said first recording medium, said group management data, stored in said management data area, managing a plurality of said data as a data group, reading means for reading said selected group management data and said data group managed by said selected group management data, and transfer means for transferring said read group management data and said data group managed by said selected group management data to an external device; and said data transfer system also comprising:

a portable recording and reproducing apparatus for receiving data and management data for managing said data received from said recording/reproducing apparatus and recording said received data and said received management data onto a second recording medium, including recording means for recording a data group received from said recording/reproducing apparatus into a data area of said second recording medium and said group management data into a management data area of said second recording medium, second selecting means for selecting, in accordance with a user operation, said group management data recorded on said second recording medium, reproducing means for reproducing a plurality of data managed by said group management data selected by said second selecting means, and control means for controlling said reproducing means so as to reproduce said plurality of data, in units of said data group received from said recording/reproducing apparatus, managed by said group management data selected by said second selecting means.

* * * * *